United States Patent
Takeda et al.

(10) Patent No.: US 7,206,097 B2
(45) Date of Patent: Apr. 17, 2007

(54) PATCH MEASUREMENT DEVICE AND PRINTING APPARATUS INCORPORATING THE SAME

(75) Inventors: Kazuya Takeda, Kyoto (JP); Kazuki Fukui, Kyoto (JP)

(73) Assignee: Dainippon Screen Mfg. Co., Ltd., Osaka (JP)

( * ) Notice: Subject to any disclaimer, the term of this patent is extended or adjusted under 35 U.S.C. 154(b) by 954 days.

(21) Appl. No.: 10/419,088

(22) Filed: Apr. 21, 2003

(65) Prior Publication Data

US 2003/0210413 A1    Nov. 13, 2003

(30) Foreign Application Priority Data

May 9, 2002    (JP) .............................. 2002-134342

(51) Int. Cl.
  H04N 1/58    (2006.01)
  H04N 1/60    (2006.01)
  B41J 2/385    (2006.01)

(52) U.S. Cl. ..................... 358/1.9; 358/504; 358/521; 399/49; 347/116

(58) Field of Classification Search ................ 358/1.9, 358/3.21, 518–521, 504; 399/49, 301; 347/116
  See application file for complete search history.

(56) References Cited

U.S. PATENT DOCUMENTS

| | | | |
|---|---|---|---|
| 5,182,721 A | | 1/1993 | Kipphan et al. |
| RE35,495 E | | 4/1997 | Bolza-Schuenemann et al. |
| 6,041,708 A | | 3/2000 | Kapphan et al. |
| 6,100,982 A | | 8/2000 | Tobias et al. |
| 6,381,435 B2 | * | 4/2002 | Shinohara et al. .......... 399/301 |
| 6,715,417 B2 | | 4/2004 | Okuda |
| 6,860,202 B2 | | 3/2005 | Okuda |
| 6,911,993 B2 | * | 6/2005 | Nishikawa et al. ......... 347/116 |
| 2002/0043166 A1 | | 4/2002 | Okuda |
| 2003/0011798 A1 | * | 1/2003 | Yamamoto et al. .......... 399/1.9 |
| 2004/0174574 A1 | | 9/2004 | Okuda |
| 2006/0002727 A1 | * | 1/2006 | Kanzaki ...................... 399/49 |

FOREIGN PATENT DOCUMENTS

EP    0 518 559    12/1992

(Continued)

*Primary Examiner*—Scott A. Rogers
(74) *Attorney, Agent, or Firm*—McDermott Will & Emery LLP

(57) ABSTRACT

There is provided a patch measurement device which, even if the position of a patch in a control strip printed on a printed material is incorrectly detected, does not affect the controlling of the printing apparatus. A data storage section 271 in a patch measurement device 27 stores printed-image data Dpd. A reference mark detection section 272 detects a reference mark rm in the printed-image data Dpd, and generates position data thereof. A reference mark position data comparison section 273 compares the position data against past position data stored in a reference mark position data storage section 274 to determine the validity of the position data. If the position data is valid, a patch position detection section 275 detects a patch whose color density is to be measured. A color density measurement section 276 generates color density measurement data of the printed patch. A color density calculation section 277 calculates color density information Dct by using current and past color density measurement data stored in a color density measurement data storage section 278.

17 Claims, 15 Drawing Sheets

FOREIGN PATENT DOCUMENTS

| | | |
|---|---|---|
| EP | 1 149 703 | 10/2001 |
| JP | 55-138250 | 10/1980 |
| JP | 2824334 | 8/1992 |
| JP | 08-118609 | 5/1996 |
| JP | 08-323964 | 12/1996 |
| JP | 2000-261618 | 9/2000 |
| JP | 2002-127373 | 5/2002 |

\* cited by examiner

F I G. 2
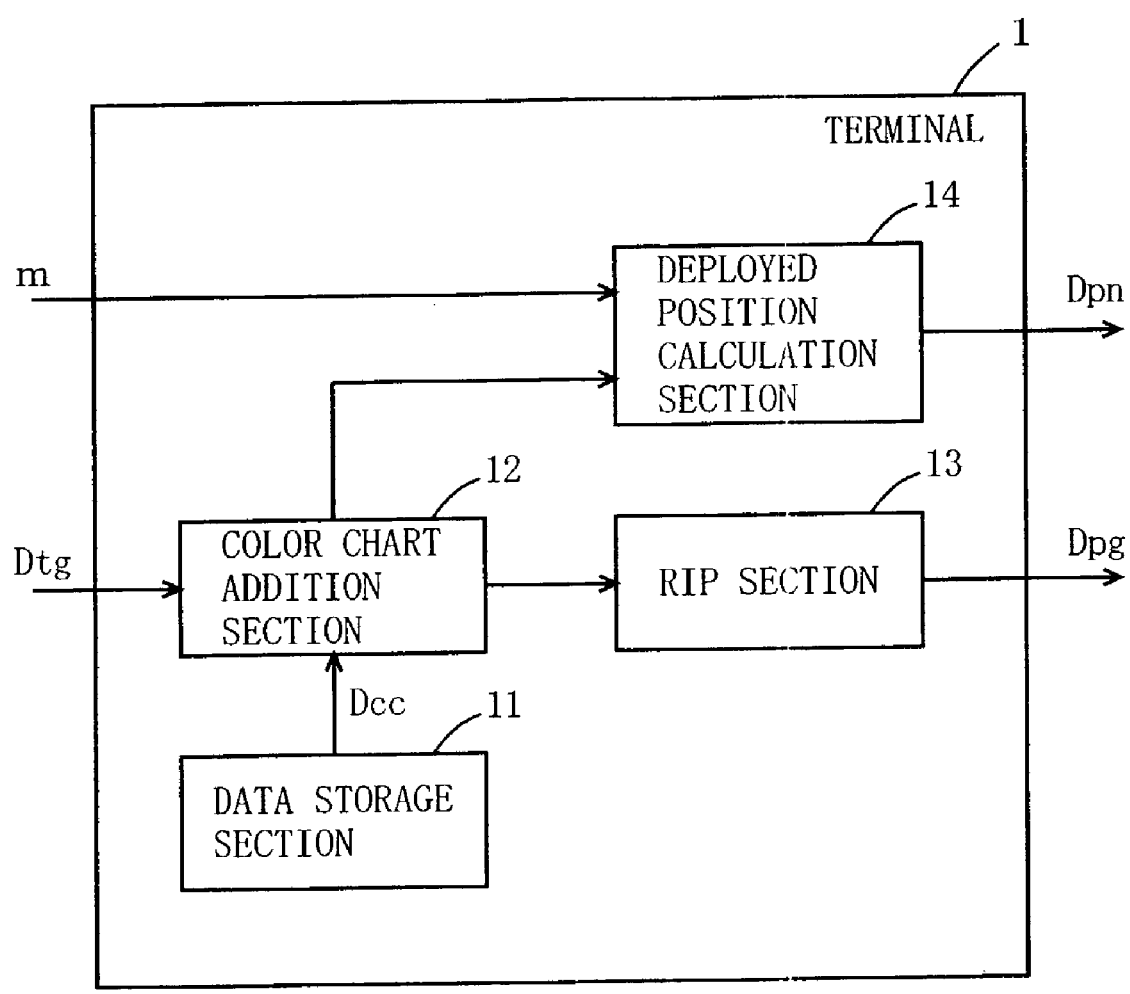

FIG. 10A

POSITION DATA TABLE

|  | ACTIVE POSITION DATA | | | STATIC POSITION DATA | | |
|---|---|---|---|---|---|---|
| COUNT VALUE | $na1$ | $na2$ | $na3$ | $ns1$ | $ns2$ | $ns3$ |
| POSITION DATA | $La1$ | $La2$ | $La3$ | $Ls1$ | $Ls2$ | $Ls3$ |

FIG. 10B

COLOR DENSITY MEASUREMENT DATA TABLE

| COUNT VALUE | $na1$ | $na2$ | $na3$ |
|---|---|---|---|
| COLOR DENSITY MEASUREMENT DATA | $Da1$ | $Da2$ | $Da3$ |

FIG. 13

| n | 46 | 47 | 48 | 49 | 50 | 51 | 52 | 53 | 54 |
|---|---|---|---|---|---|---|---|---|---|
| DETECTED POSITION DATA | 30 | 30 | 30 | 30 | 0 | 30 | 30 | 30 | 30 |
| La1 | 30 | 30 | 30 | 30 | 30 | 0 | 30 | 30 | 30 |
| La2 | 30 | 30 | 30 | 30 | 30 | 30 | 0 | 30 | 30 |
| La3 | 30 | 30 | 30 | 30 | 30 | 30 | 30 | 0 | 30 |
| La$_{ave}$ | 30 | 30 | 30 | 30 | 30 | 20 | 20 | 20 | 30 |
| Ls1 | 30 | 30 | 30 | 30 | 30 | 30 | 30 | 30 | 30 |
| Ls2 | 30 | 30 | 30 | 30 | 30 | 30 | 30 | 30 | 30 |
| Ls3 | 30 | 30 | 30 | 30 | 30 | 30 | 30 | 30 | 30 |
| Ls$_{ave}$ | 30 | 30 | 30 | 30 | 30 | 30 | 30 | 30 | 30 |

▢ ··· DETECTED POSITION DATA DETERMINED AS INVALID

| n | 1 | 2 | 3 | 4 | 5 | 6 | 7 | 8 | 9 |
|---|---|---|---|---|---|---|---|---|---|
| DETECTED POSITION DATA | 0 | 0 | 0 | 30 | 30 | 30 | 30 | 30 | 30 |
| La1 | – | 0 | 0 | 0 | 30 | 30 | 30 | 30 | 30 |
| La2 | – | – | 0 | 0 | 0 | 30 | 30 | 30 | 30 |
| La3 | – | – | – | 0 | 0 | 0 | 30 | 30 | 30 |
| La$_{ave}$ | – | 0 | 0 | 0 | 10 | 20 | 30 | 30 | 30 |
| Ls1 | – | 0 | 0 | 0 | 0 | 0 | 0 | 30 | 30 |
| Ls2 | – | – | 0 | 0 | 0 | 0 | 0 | 30 | 30 |
| Ls3 | – | – | – | 0 | 0 | 0 | 0 | 30 | 30 |
| Ls$_{ave}$ | – | 0 | 0 | 0 | 0 | 0 | 0 | 30 | 30 |

...DETECTED POSITION DATA DETERMINED AS INVALID

PATCH MEASUREMENT DEVICE AND PRINTING APPARATUS INCORPORATING THE SAME

BACKGROUND OF THE INVENTION

1. Field of the Invention

The present invention relates to a patch measurement device provided in a printing apparatus, and more particularly to a patch measurement device for measuring color density of patches constituting a control strip which is printed on printing paper.

2. Related Art Statement

There have conventionally been realized printing apparatuses which incorporate a so-called CTP (Computer To Plate) device, i.e., a prepressing device (=a printing plate recording device) that generates an image on a printing plate based on digital image data. A printing apparatus of this type, referred to as a DI (direct imaging) press, is capable of producing printed materials directly from image data, and therefore may be suitable for producing a variety of printed materials, each in relatively small quantities, over short periods of time. While prepress and other processes in such a digital printing apparatus are automated for ease of operation by non-proficient operators, further automation is desired in the control of ink supply, for example, during a printing process.

The control of ink supply in a conventional printing apparatus is generally realized by means of a separate console-type color measurement device, where a produced sample print is measured on a table. In this case, there is a problem in that a human operator needs to take out sample prints from the printing apparatus as necessary to measure the colors appearing on the printed materials.

In order to reduce the amount of work which requires the presence of a human operator as mentioned above, Japanese Patent No. 2824334 discloses a printing apparatus comprising a means for capturing an image of a printed material. In accordance with this printing apparatus, an image of a printed material is captured on an impression cylinder of the printing apparatus, whereby image data is obtained. This image data is compared against reference image data, which is previously read from a printed material that serves as a control reference, and the amount of supplied ink is controlled based on the comparison result. This printing apparatus has an advantage in that there is no need for a human operator as in the case of employing a console-type color measurement device because the printed material is imaged within the printing apparatus.

However, the aforementioned printing apparatus has a problem in that, since an image of the entire printed material must be read for comparison against the reference image, the size of the image data to be handled becomes large, thus requiring a relatively long image data processing time. Since it is necessary to prepare a reference image, this printing apparatus is not suitable for producing relatively few copies of a variety of printed materials, where agility is of the essence.

In order to solve the above problem, a printing apparatus has been proposed which prints a control strip (other than the actual printing image) on a printed material, such that the control strip is measured within the printing apparatus. FIGS. 15A and 15B are diagrams illustrating specific examples of such control strips. Hereinafter, the details of these control strips will be described with reference to FIGS. 15A and 15B.

FIG. 15A is a diagram illustrating a printed material S which may be obtained by using the conventional printing apparatus. As shown in FIG. 15A, the conventional printing apparatus prints an image im on printing paper, and thereafter prints four control strips cs1 to cs4 and three reference marks rm1 to rm3 on the same printing paper. Hereinafter, such four control strips cs1 to cs4 may collectively be referred to as "control strips cs", and the three reference marks rm1 to rm3 as "reference marks rm".

The image im is printed on the printing paper, beginning at a position (hereinafter referred to as a "print start position") which is located a predetermined gripper margin f away from the leading end of the printing paper. More specifically, the image im is progressively printed in the direction of print progress indicated by the arrow (hereinafter referred to as a "first printing direction"), beginning from the print start position. The image im has a dimension m along the first printing direction, which is designated according to the image size. The control strips cs and the reference marks rm are printed beginning at a position which is a predetermined distance n away from the trailing end of the image im.

As shown in FIG. 15A, the control strips cs are typically printed on the printing paper with predetermined intervals therebetween along a direction (hereinafter referred to as a "second printing direction") perpendicular to the first printing direction, and each control strip cs includes a plurality of rectangular-shaped patches arranged in a predetermined order. Each patch may be a half-tone, linework, or solid image which is printed at a predetermined density in a predetermined color. FIG. 15A illustrates an exemplary patch pc1.

As shown in FIG. 15A, the reference mark rm1 is interposed between two adjoining control strips cs2 and cs3. The reference mark rm2 is interposed between the control strips cs1 and cs2, and the reference mark rm3 is interposed between the control strips cs3 and cs4. As such, the reference marks rm1 to rm3 serve as references based on which to detect the positions of the control strips cs1 to cs4. Typically, as exemplified by the reference mark rm1 shown in FIG. 15B, a reference mark comprises two bars b1 and b2 which run parallel to the first printing direction, and a cross mark c interposed between the bars b1 and b2. Each patch is printed at a position which is predetermined distances away—along the first and second printing directions—from a crosspoint P of the cross mark c. For example, the patch pc1 is printed so that the center thereof is at a distance h (along the first printing direction) and at a distance w (along the second printing direction) from the crosspoint P of the reference mark rm1.

An image of the printed material S is captured by an imaging device provided in the printing apparatus, and is passed as "printed-image data" (i.e., data representing the actually produced printed material) to a patch processing device which is provided in the printing apparatus. Assuming that the patch pc1 is currently to be processed by the patch processing device, the patch processing device first needs to detect the position of the patch pc1 in order to be able to measure the patch pc1. Therefore, the positions of the three reference marks rm1 to rm3 are detected by applying a pattern recognition technique to the reference marks rm, and the position of the patch pc1 is calculated on the basis of the reference mark rm1. The reference marks rm may be detected as follows. Firstly, the patch measurement device previously obtains a pixel array pattern in the vicinity of the crosspoint P1 of the cross mark c interposed between the bars b1 and b2 in each reference mark rm. Next, the patch measurement device checks whether or not this pixel array pattern matches is contained in the imaged printed-image data, while shifting the pixels one by one. The patch measurement device applies such a technique to the printed-image data, individually along the first and second printing direction, and ascertains the coordinates indicating the highest match as a reference mark rm.

Then, the patch processing device first detects the crosspoint P of the reference mark rm1. Furthermore, the patch processing device estimates that a position which is at the patch distance h (along the first printing direction) and at the patch distance w (along the second printing direction) from the detected crosspoint P should be the relative position of the center of the patch pc1, which is currently to be processed. Thereafter, the patch processing device measures the color density information of the patch pc1 at the estimated relative position.

However, the aforementioned technique of detecting reference marks rm through pattern recognition can be hindered by the strong correlation between the pixel array pattern and any pattern present in the printed-image data that resembles the pixel array pattern. In other words, if any pattern resembling the pixel array pattern exists in the neighborhood of a reference mark rm due to flares in the optical system, print smears, and the like, this resembling pattern may erroneously be recognized as a reference mark rm. This results in a failure to detect the actual reference mark rm, and instead a false position will be detected. In particular, since the printed material S is read by the printing apparatus during its transportation, the read position of the printed material S may fluctuate due to recoil and like actions of the printed material S during its transportation. As a result, the detected position of each reference mark rm will be incorrect, so that the wrong position of the patches composing the associated control strip cs will be detected. In such a case, the patch measurement device will try to measure the color density information of a patch in a false position, resulting in the wrong color density information being provided to the printing apparatus. As a result, the ink supply control and the like during the printing process cannot be properly attained. Conventionally, in order to prevent the wrong color density information from being provided to the printing apparatus, a predetermined threshold value is used for determining the validity of the color density information. However, in general, a printing apparatus tends to increase its printing density gradually from the beginning of printing, and the conventional method of employing a threshold value cannot properly address such changes in the printing density.

SUMMARY OF THE INVENTION

Therefore, an object of the present invention is to provide a patch measurement device which, even when misdetecting the position of a patch in a control strip printed on a printed material, leaves the control of the printing apparatus unaffected.

The present invention has the following features to attain the object mentioned above.

A first aspect of the present invention is directed to a patch measurement device provided in a printing apparatus for measuring a color density of a patch in a control strip printed on paper by the printing apparatus, wherein, the control strip and a reference mark are printed on the paper, and printed-image data representing the control strip and the reference mark printed on the paper are generated through imaging by an imaging device provided in the printing apparatus, the patch measurement device comprising: an image data storage section for storing the printed-image data sent from the imaging device; a reference mark detection section for detecting the reference mark based on the printed-image data stored in the image data storage section, and generating position data of the reference mark; a position data storage section for storing the position data generated by the reference mark detection section; a reference mark position data comparison section for determining whether the current position data of the reference mark as detected by the reference mark detection section is valid or not by using the past position data stored in the position data storage section; and a color density measurement section for generating color density measurement data by measuring a color density of the patch based on the result of the determination by the reference mark position data comparison section.

Thus, according to the first aspect, the validity of position data of a reference mark which serves as a reference for detecting the position of a control strip is determined by using past instances of such position data. Since the control strip printed on the printed material is subjected to a color density measurement which is based on the result of the determination of the position data, the incorrect color density measurement data is prevented from being transmitted to a printing apparatus. By ensuring that the control strip printed on the printed material is not subjected to a color density measurement depending on the result of the determination of the position data, it becomes possible to reduce the processing cost.

Based on a plurality of most-recently stored pieces of position data in the position data storage section, the reference mark position data comparison section may determine whether or not the current position data of the reference mark as detected by the reference mark detection section satisfies a predetermined value. In this case, when an abruptly deviated value of position data for the reference mark is detected in the determination of the validity of the position data based on past instances of such position data, the deviated position data can be determined to be invalid. Furthermore, even if incorrect position data is temporarily written as past position data, it eventually becomes possible to determine the accurate position data to be valid when the position data of the reference mark again begins to indicate the accurate position. Even if the detected position data presents gradually increasing or decreasing values, the validity of such position data can be accurately determined accordingly. In other words, the present patch measurement device can successfully cope with the general tendency of printing apparatuses, i.e., gradually increasing printing density from the beginning of printing and the initial instability of operation. In another embodiment, based on a plurality of pieces of position data stored in the position data storage section which have previously been determined to be valid, the reference mark position data comparison section may determine whether or not the current position data of the reference mark as detected by the reference mark detection section satisfies a predetermined value. In this case, when an abruptly deviated value of position data for the reference mark is detected in the determination of the validity of the position data based on past instances of such position data, only the deviated position data can be determined to be invalid. In other words, once the accurate position data begins to be detected after an abruptly deviated value of position data for the reference mark is detected, the newly-detected accurate position data can be immediately determined as valid, based on a plurality of pieces of position data which have already been determined as valid.

The patch measurement device may further comprise: a color density measurement data storage section for storing the color density measurement data generated by the color density measurement section; and a color density calculation section for generating color density information by performing a predetermined calculation by using the color density measurement data stored in the color density measurement data storage section, and outputting the color density information to the printing apparatus. Thus, the control strip printed on the printed material is not subjected to a color density measurement depending on the result of the determination of the position data, in which case color density information is calculated and outputted by using the valid color density measurement data which has been measured in the past, thereby preventing the incorrect color density measurement data from being transmitted to a printing apparatus. Therefore, at the printing apparatus, it is possible to properly control the ink supply amounts and the like during a printing process. In another embodiment, when the reference mark position data comparison section determines the position data of the reference mark as detected by the reference mark detection section to be valid, the color density measurement section generates current color density measurement data representing the current color density of the patch, the color density calculation section generates the color density information by performing a predetermined calculation by using the current color density measurement data and the past color density measurement data stored in the color density measurement data storage section, and when the reference mark position data comparison section determines the position data of the reference mark as detected by the reference mark detection section to be invalid, the color density calculation section generates the color density information by performing a predetermined calculation by using only the past color density measurement data stored in the color density measurement data storage section. Thus, the validity of position data of a reference mark which serves as a reference for detecting the position of a control strip is determined by using past instances of such position data. If the position data is determined as invalid, the control strip printed on the printed material is not subjected to a color density measurement, and the valid color density information obtained in the past is subjected to a calculation and outputted, thereby preventing the incorrect color density information from being transmitted to a printing apparatus. On the other hand, if the position data is determined as valid, current color density measurement data is generated, and color density information is calculated based on the current color density measurement data, so that information on the most-recent printed state can be outputted to the printing apparatus. Thus, it is possible to cope with the general tendency of printing apparatuses, i.e., gradually increasing printing density from the beginning of printing and the initial instability of operation. In still another embodiment, when the reference mark position data comparison section has determined the position data of the reference mark as detected by the reference mark detection section to be invalid more than a predetermined number of times, the color density calculation section may generate, as the color density information, an alert message indicating a failure to measure the color density. Thus, when failure to accurately detect the reference mark occurs in successive instances, information on the mulfunctioning of the printing apparatus can be outputted as an alert message as appropriate. The color density information calculated by the color density calculation section may be outputted to a display device provided in the printing apparatus. Thus, by displaying the current color density information of the printing apparatus on the display device, the color density information can be provided to the operator of the printing apparatus in real time.

A second aspect of the present invention is directed to a printing apparatus for printing an image to be printed, a control strip, and a reference mark on paper, comprising: a prepressing mechanism for forming the image to be printed, the control strip, and the reference mark on a printing plate; a printing mechanism for applying at least ink on the printing plate fed from the prepressing mechanism, and transferring the image to be printed, the control strip, and the reference mark from the printing plate having the ink applied thereto onto the paper; an imaging device for imaging, within the printing mechanism, a portion of the paper where at least the control strip and the reference mark are printed, thereby generating printed-image data; a patch measurement device for, based on the printed-image data generated by the imaging device, detecting a patch position representing a position of a patch in the control strip with respect to the reference mark, measuring a color density of the patch, and calculating the result of measurement as color intensity information; and a display device for displaying the color density information calculated by the patch measurement device, the patch measurement device comprising: an image data storage section for storing the printed-image data sent from the imaging device; a reference mark detection section for detecting the reference mark based on the printed-image data stored in the image data storage section, and generating position data of the reference mark; a position data storage section for storing the position data generated by the reference mark detection section; a reference mark position data comparison section for determining whether the current position data of the reference mark as detected by the reference mark detection section is valid or not by using the past position data stored in the position data storage section; a color density measurement section for generating color density measurement data by measuring a color density of the patch based on the result of the determination by the reference mark position data comparison section; a color density measurement data storage section for storing the color density measurement data generated by the color density measurement section; and a color density calculation section for generating color density information by performing a predetermined calculation by using the color density measurement data stored in the color density measurement data storage section, wherein the printing mechanism adjusts the amount of ink to be applied to the printing plate based on the color density information calculated by the patch measurement device.

Thus, according to the second aspect, the aforementioned effects according to the first aspect of the present invention can be obtained in a printing apparatus.

Based on a plurality of most-recently stored pieces of position data in the position data storage section, the reference mark position data comparison section may determine whether or not the current position data of the reference mark as detected by the reference mark detection section satisfies a predetermined value. Based on a plurality of pieces of position data stored in the position data storage section which have previously been determined to be valid, the reference mark position data comparison section may determine whether or not the current position data of the reference mark as detected by the reference mark detection section satisfies a predetermined value.

In one embodiment, when the reference mark position data comparison section determines the position data of the reference mark as detected by the reference mark detection section to be valid, the color density measurement section generates current color density measurement data representing the current color density of the patch, the color density calculation section generates the color density information by performing a predetermined calculation by using the current color density measurement data and the past color density measurement data stored in the color density measurement data storage section, and when the reference mark position data comparison section determines the position data of the reference mark as detected by the reference mark detection section to be invalid, the color density calculation section generates the color density information by performing a predetermined calculation by using only the past color density measurement data stored in the color density measurement data storage section. In still another embodiment, when the reference mark position data comparison section has determined the position data of the reference mark as detected by the reference mark detection section to be invalid more than a predetermined number of times, the color density calculation section generates, as the color density information, an alert message indicating a failure to measure the color density.

A third aspect of the present invention is directed to a patch measurement method for measuring a color density of a patch in a control strip printed on paper, wherein the control strip and a reference mark are printed on the paper, the method comprising: an image data storage step of storing printed-image data representing the control strip and the reference mark printed on the paper; a reference mark detection step of detecting the reference mark based on the printed-image data stored by the image data storage step, and generating position data of the reference mark; a position data storage step of storing the position data generated by the reference mark detection step; a reference mark position data comparison step of determining whether the current position data of the reference mark as detected by the reference mark detection step is valid or not by using the past position data stored by the position data storage step; and a color density measurement step of generating color density measurement data by measuring a color density of the patch based on the result of the determination by the reference mark position data comparison step.

Thus, according to the third aspect, the validity of position data of a reference mark which serves as a reference for detecting the position of a control strip is determined by using past instances of such position data. Since the control strip printed on the printed material is subjected to a color density measurement which is based on the result of the determination of the position data, the incorrect color density measurement data is prevented from being transmitted to a printing apparatus. By ensuring that the control strip printed on the printed material is not subjected to a color density measurement depending on the result of the determination of the position data, it becomes possible to reduce the processing cost.

Based on a plurality of most-recently stored pieces of position data in the position data storage step, the reference mark position data comparison step may determine whether or not the current position data of the reference mark as detected by the reference mark detection step satisfies a predetermined value. Based on a plurality of pieces of position data stored by the position data storage step which have previously been determined to be valid, the reference mark position data comparison step may determine whether or not the current position data of the reference mark as detected by the reference mark detection step satisfies a predetermined value.

The patch measurement method may further comprise: a color density measurement data storage step of storing the color density measurement data generated by the color density measurement step; and a color density calculation step of generating color density information by performing a predetermined calculation by using the color density measurement data stored by the color density measurement data storage step and outputting the color density information to a printing apparatus. In one embodiment, when the reference mark position data comparison step determines the position data of the reference mark as detected by the reference mark detection step to be valid, the color density measurement step generates current color density measurement data representing the current color density of the patch, the color density calculation step generates the color density information by performing a predetermined calculation by using the current color density measurement data and the past color density measurement data stored by the color density measurement data storage step, and when the reference mark position data comparison step determines the position data of the reference mark as detected by the reference mark detection step to be invalid, the color density calculation step generates the color density information by performing a predetermined calculation by using only the past color density measurement data stored by the color density measurement data storage step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a functional block diagram illustrating the detailed structure of a terminal 1 shown in FIG. 1;

FIG. 10A illustrates an example of a position data table used in a patch measurement device 27 shown in FIG. 1;

FIG. 10B illustrates an example of a color density measurement data table used in a patch measurement device 27 shown in FIG. 1;

FIG. 13 illustrates a manner in which the position data table is updated through the color density information calculation procedure by the patch measurement device 27 shown in FIG. 1 in an exemplary case where an abruptly deviated value of position data for a reference mark rm1 is detected;

DESCRIPTION OF THE PREFERRED EMBODIMENTS

Figure 1:
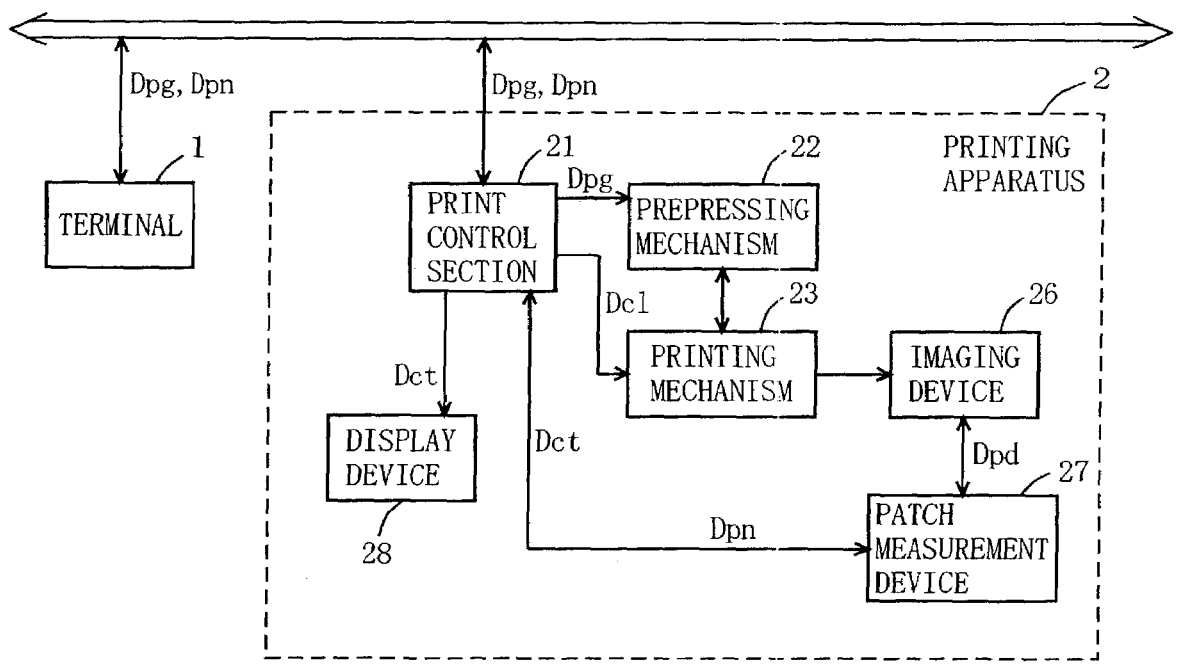
FIG. 1 is a functional block diagram illustrating the structure of a printing system incorporating a patch measurement device 27 according to an embodiment of the present invention.

FIG. 1 is a functional block diagram illustrating the structure of a printing system incorporating a patch measurement device 27 according to an embodiment of the present invention. Via a network, a terminal 1 and a printing apparatus 2 are coupled to the printing system shown in FIG. 1 so as to be capable of communicating with each another.

The terminal 1, which lies external to the printing apparatus 2, is a computer system comprising a CPU, a main storage device, a display device, an input device, and an auxiliary storage device. By operating the terminal 1, an operator edits or generates data based on which an image is formed on a printing plate (hereinafter referred to as "image-to-print data Dpg"), and transmits the image-to-print data Dpg to the printing apparatus 2. As already described with reference to FIGS. 15A and 15B, the image-to-print data Dpg represents an image im (as a main subject of printing by the printing apparatus 2), four control strips cs1 to cs4, and three reference marks rm1 to rm3. Hereinafter, the four control strips cs1 to cs4 may collectively be referred to as "control strips cs", and the three reference marks rm1 to rm3 as "reference marks rm".

The printing apparatus 2 produces a printing plate based on the image-to-print data Dpg received from the terminal 1. The printing apparatus 2 transfers the ink which has been supplied to the produced printing plate onto a printing paper, gradually proceeding in a direction of print progress indicated by an arrow in FIGS. 15A and 15B (hereinafter referred to as a "first printing direction"). Thus, the printing apparatus 2 prints the image im shown in FIG. 15A, followed by the four control strips cs1 to cs4 and the three reference marks rm1 to rm3.

The image im is printed on the printing paper, beginning at a position (hereinafter referred to as a "print start position") which is located a predetermined gripper margin f away from the leading end of the printing paper. More specifically, the image im is progressively printed in the first printing direction, beginning from the print start position. The image im has a dimension m along the first printing direction, which is to be designated according to the image size. The control strips cs and the reference marks rm are printed beginning at a position which is a predetermined distance n away from the trailing end of the image im. Therefore, the approximate positions of the control strips cs and the reference marks rm on the printed material S along the first printing direction can be easily determined.

Figure 15A:
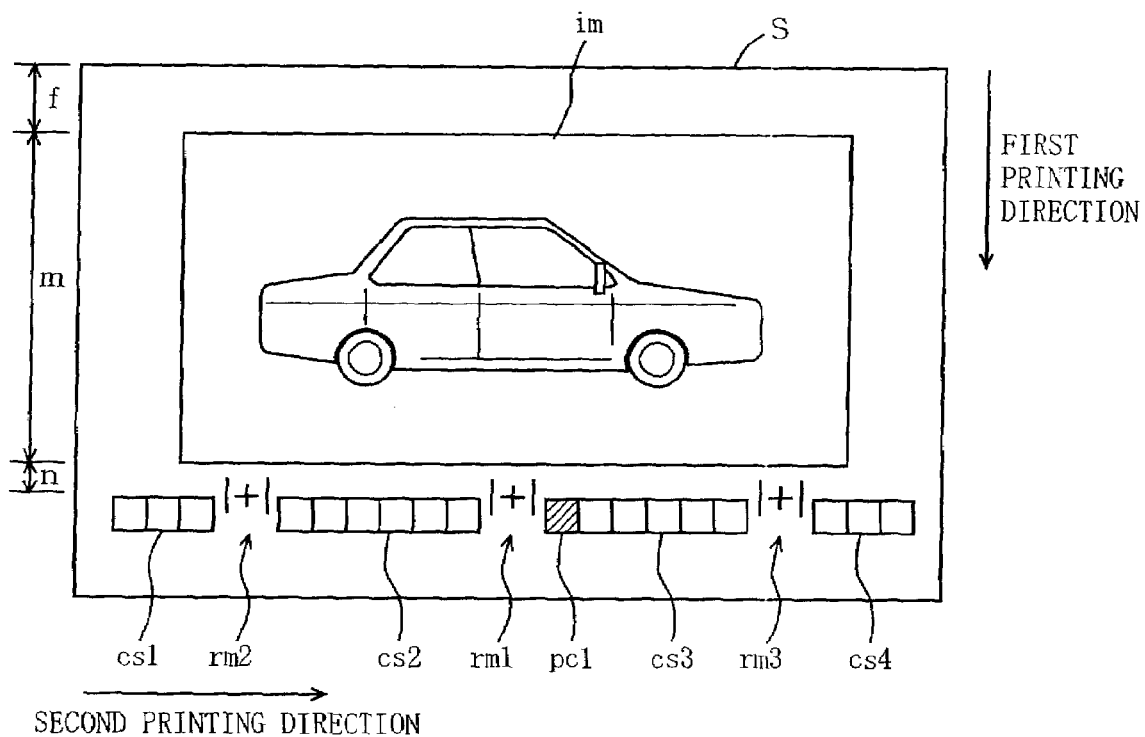
FIGS. 15A and 15B are diagrams illustrating control strips cs which are printed by a printing apparatus.

As shown in FIG. 15A, the control strips cs are typically printed side by side on the printing material S with predetermined intervals therebetween along a direction (hereinafter referred to as a "second printing direction") perpendicular to the first printing direction, and each control strip cs includes a plurality of rectangular-shaped patches arranged in a predetermined order. Each patch may be a halftone, linework, or solid image which is printed with a predetermined density in a predetermined color. FIG. 15A illustrates an exemplary patch pc1.

As shown in FIG. 15A, the reference mark rm1 is interposed between two adjoining control strips cs2 and cs3 The reference mark rm2 is interposed between the control strips cs1 and cs2, and the reference mark rm3 is interposed between the control strips cs3 and cs4. As such, the reference marks rm1 to rm3 serve as references based on which to detect the positions of the control strips cs1 to cs4. Typically, as exemplified by the reference mark rm1 shown in FIG. 15B, a reference mark comprises two bars b1 and b2 which run parallel to the first printing direction, and a cross mark c interposed between the bars b1 and b2. Each patch is printed at a position which is predetermined distances (hereinafter referred to as "patch distances") away—along the first and second printing directions—from the crosspoint (P1 to P3) of the cross mark c of a corresponding reference mark (rm1 to rm3). For example, the patch pc1 is printed so that the center thereof is at a patch distance h (along the first printing direction) and at a patch distance w (along the second printing direction) from the crosspoint P1 of the reference mark rm1. The image-to-print data Dpg is generated in such a manner that the control strip cs1 and cs4 are positioned in a point-symmetrical relationship around the crosspoint P1 of the reference mark rm1, and that the control strips cs2 and cs3 are positioned in a similar point-symmetrical relationship. Hereinafter, the crosspoints P1 to P3 may collectively be referred to as "crosspoints P".

Hereinafter, the details of the terminal 1 for producing the aforementioned image-to-print data Dpg will be described with reference to FIG. 2. FIG. 2 is a functional block diagram illustrating the detailed structure of the terminal 1 shown in FIG. 1. As shown in FIG. 2, the terminal 1 comprises a data storage section 11, a color chart addition section 12, an RIP section 13, and a deployed position calculation section 14. The data storage section 11 previously stores color chart data Dcc representing the reference marks rm and control strips cs. Subject image data Dtg representing the image im to be printed is externally supplied to the color chart addition section 12. As described above, the subject image data Dtg is generated or edited by the terminal 1. The color chart addition section 12 adds the color chart data Dcc (which is stored in the data storage section 11) to the received subject image data Dtg. The RIP section 13 performs an RIP (Raster-Image-Processing) for the subject image data Dtg to which the color chart data Dcc has been added, thereby generating the aforementioned image-to-print data Dpg in the form of binary data. The RIP section 13 transmits the generated image-to-print data Dpg to a print control section 21 in the printing apparatus 2 via the network.

According to the present embodiment, the color chart addition section 12 automatically performs the aforementioned processes in accordance with a predetermined deployment condition, e.g., "add control strips cs and reference marks rm at a position following the image im to be printed". Alternatively, an operator may manually determine how the control strips cs and the like are deployed.

The deployed position calculation section 14 calculates the positions of the control strips cs and the reference marks rm. For example, if the predetermined deployment condition used in the color chart addition section 12 is "add control strips cs and reference marks rm at a position following the image im to be printed", the deployed position calculation section 14 can calculate the position of the control strips Cs and the reference marks rm on the printing paper by adding the predetermined gripper margin f and the dimension m of the image im (see FIG. 15A). Herein, the terminal 1 may derive the dimension m of the image im directly from the aforementioned subject image data Dtg, or the dimension m may be obtained from an external image data generation device (not shown) which actually generated the subject image data Dtg. Via the network, the deployed position calculation section 14 transmits the thus-calculated deployed position to the print control section 21 in the printing apparatus 2 as deployed position information Dpn. In the case where an operator deploys the control strips cs and the reference marks rm at arbitrary positions, the deployed position calculation section 14 may calculate the deployed position based on the relative positions of the control strips Cs and the reference marks rm with respect to the image in represented by the subject image data Dtg.

Referring back to FIG. 1, the printing apparatus 2 comprises: the print control section 21, a prepressing mechanism 22, a printing mechanism 23, an imaging device 26, the patch measurement device 27, and a display device 28. The print control section 21, which is a computer system realized by means of a CPU and like elements mounted on a substrate, controls the prepressing mechanism 22 and the printing mechanism 23 via various interfaces. In a typical process, the print control section 21 receives image-to-print data Dpg from the terminal 1 via the network, and sends the received image-to-print data Dpg to the prepressing mechanism 22. In another typical process, the print control section 21 receives the deployed position information Dpn from the terminal 1 via the network and sends the deployed position information Dpn to the patch measurement device 27. Furthermore, based on color density information Dct (described later) provided from the patch measurement device 27, the print control section 21 generates control information Dcl, which is used for adjusting the supply amounts of ink and/or dampening water used in the printing mechanism 23 (described later), and outputs the generated color density information Dct to the display device 28.

Based on the image-to-print data Dpg sent from the print control section 21, the prepressing mechanism 22 forms an image on a printing plate. By employing a printing plate which is formed by the prepressing mechanism 22 or obtained from another source, the printing mechanism 23 transfers an ink image onto printing paper.

Figure 3:
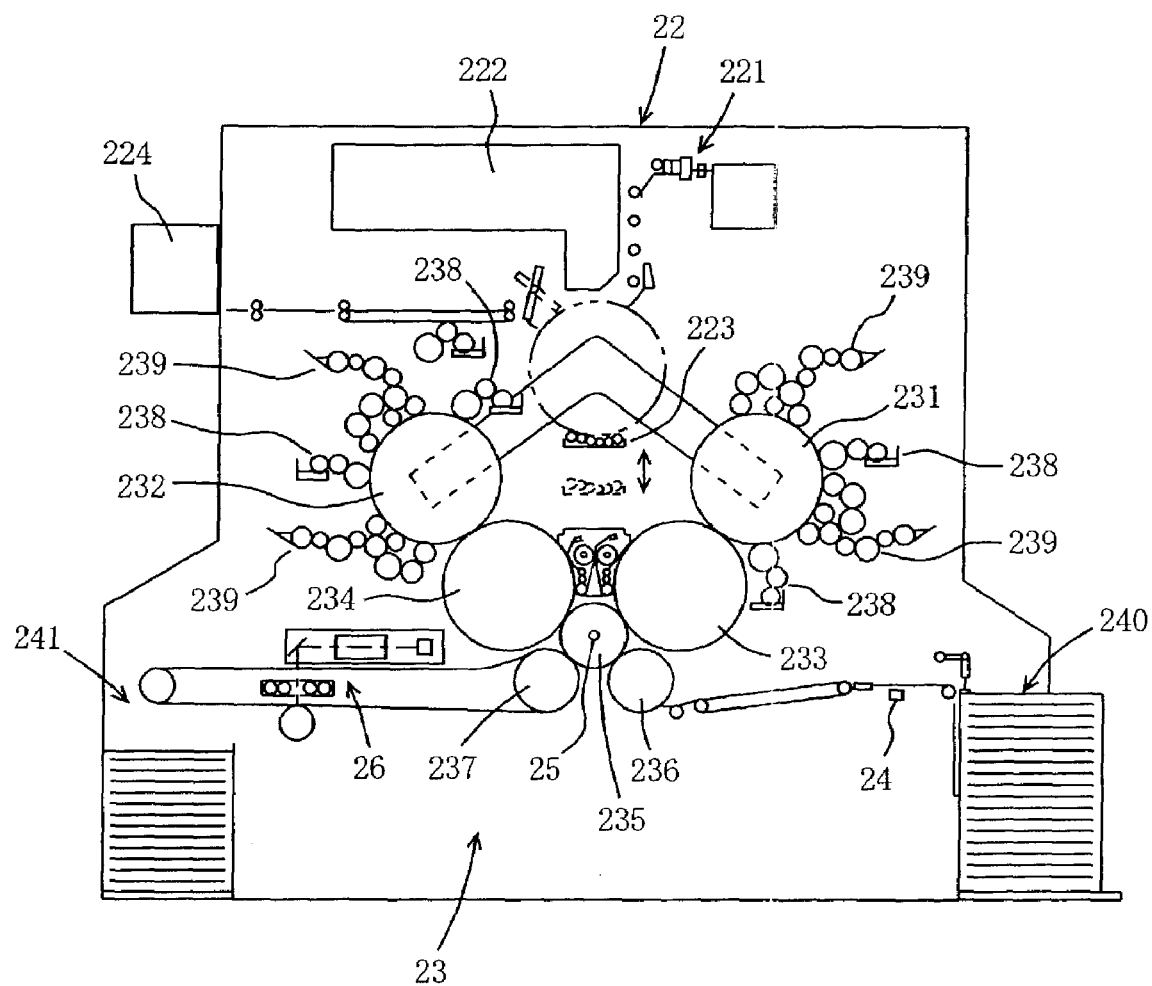
FIG. 3 is a schematic side view illustrating a prepressing mechanism 22 and a printing mechanism 23 shown in FIG. 1.

Hereinafter, detailed structures of the prepressing mechanism 22 and the printing mechanism 23 will be described with reference to FIG. 3. FIG. 3 is a schematic side view illustrating the prepressing mechanism 22 and the printing mechanism 23 shown in FIG. 1. Referring to FIG. 3, the prepressing mechanism 22, which performs a prepress process, comprises a printing plate supply section 221, an image recording section 222, a development section 223, and a printing plate discharging section 224. The printing plate supply section 221 includes a supply cassette, transportation rollers, a transportation guide, and a cutter, although not shown in detail. The supply cassette accommodates an unexposed printing plate, which is rolled up for storage in a state shielded from light. A silver plate may be used for the printing plate, for example. The transportation rollers and the transportation guide pull out the unexposed printing plate accommodated in the supply cassette, and transports the unexposed printing plate to the plate drums 231 and 232. The cutter cuts the printing plate which is transported by the transportation rollers into separate sheets. Each sheet of unexposed printing plate is retained by the plate drums 231 and 232 (described in detail later).

Although not shown in detail, the image recording section 222 includes a laser, and a deflector such as a polygon mirror. The image recording section 222 modulates a laser light beam in accordance with the image-to-print data Dpg supplied to the prepressing mechanism 22 so as to subject the printing plate retained by the plate drums 231 and 232 to exposure, whereby the image im, all control strips cs and all reference marks rm as shown in FIG. 15A are recorded on the printing plate. The laser is driven in accordance with the image-to-print data Dpg so as to emit a laser light beam which is modulated in accordance with the image-to-print data Dpg. The deflector deflects the laser light beam emitted from the laser, whereby a horizontal scanning with the laser light beam occurs along the axial direction of the plate drum 231 or 232. Furthermore, a vertical scanning with the deflected laser light beam also occurs along the respective direction of rotation as the plate drum 231 or 232 rotates during the horizontal scanning. Alternatively, the scanning may be achieved by employing a plurality of lasers provided side by side along the axial direction of the plate drums 231 and 232, and performing a horizontal scanning with the rotations of the plate drums 231 and 232. Instead of employing an exposure technique, the image recording section 222 may record the image im, all control strips cs, and all reference marks rm by heating or electrical discharge technique.

The development section 223 performs a development process for the printing plate which has been subjected to exposure by the image recording section 222. Although not shown in detail, the development section 223 includes a processing bath, an application roller, and a moving mechanism. The processing bath stores a processing agent which is necessary for the development of the printing plate. The application roller takes up the processing agent from the processing bath and applies it to the printing plate retained by the plate drum 231 or 232, whereby the printing plate undergoes a development process. Immediately before the development of the printing plate occurs, the moving mechanism moves the application roller from a position retracted away from the plate drum 231 or 232 to a position neighboring them. After the development of the printing plate is completed, the application roller retracts the moving mechanism from the position neighboring the plate drum 231 or 232 to the retracted position. Thus, only during the development does the application roller approach the plate drum 231 or 232 to enable the processing agent to be applied on the printing plate. In the case where the image recording method employed in the image recording section 222 does not require a development process, the development section 223 may be omitted from the prepressing mechanism 22.

After the printing process by the printing mechanism 23 is completed, the printing plate discharging section 224 discharges the exposed printing plate, which is no longer of use. Although not shown in detail, the printing plate discharging section 224 includes a releasing section, transportation rollers, a transportation guide, and a discharge cassette. From the plate drums 231 and 232, the releasing section releases the printing plate on which an image has already been formed. The transportation rollers and transportation guide function to transport the printing plate which has been released from the plate drums 231 and 232 by the releasing section to the discharge cassette. The discharge cassette accommodates the printing plate which has been transported by the transportation rollers and the like.

Still referring to FIG. 3, the printing mechanism 23, which performs a printing process, comprises the plate drums 231 and 232, blanket drums 233 and 234, an impression cylinder 235, a feed drum 236, a discharge drum 237, dampening water supply units 238, ink supply units 239, a feed unit 240, and a discharge unit 241. The plate drums 231 and 232 each have a cylindrical shape, with the same diameter. A gripper unit (not shown) is provided on the cylindrical surface of each of the plate drums 231 and 232. Each gripper unit stabilizes two printing plates (corresponding to two colors) on the respective cylindrical surface, at opposing positions which are apart by 180°. By the action of a plate drum driving mechanism (not shown), the plate drum 231 moves between a first printing position (as illustrated in FIG. 3 with a solid line near the units 238 and 239 on the right-hand side) and an image recording position (as illustrated in FIG. 3 with a double-dash line). Similarly, by the action of a plate drum driving mechanism (not shown), the plate drum 232 moves between a second printing position (as illustrated in FIG. 3 with a solid line near the units 238 and 239 on the left-hand side) and the aforementioned image recording position. As described later in more detail, the plate drums 231 and 232 are alternately placed in the image recording position during a prepress process.

While the plate drum 231 or 232 is situated in the image recording position, the aforementioned printing plate which has been transported from the printing plate supply section 221 is set on the plate drum 231 or 232 in the following manner. A gripper unit (not shown) is provided on the cylindrical surface of the plate drum 231. In the image recording position, the gripper unit printing plate stabilizes two printing plates (corresponding to two colors), which has been transported from the printing plate supply section 221, at opposing positions which are apart by 180° on the cylindrical surface. Thereafter, the above-described prepress process is performed, whereby the image recording section 222 forms the image im, all control strips cs and all references mark rm (see FIG. 15A) on each printing plate retained by the plate drum 231. Then, a similar process is performed for the plate drum 232 as for the plate drum 231, whereby the image recording section 222 forms the image im, all control strips cs and all references mark rm on each of the printing plates corresponding to two colors retained by the plate drum 232. During a subsequent printing process, the plate drums 231 and 232 are placed in the first and second printing positions, as described later in detail.

The blanket drums 233 and 234 have substantially the same diameter as those of the plate drums 231 and 232. On the cylindrical surface of each of the blanket drums 233 and 234, a blanket is mounted, onto which two ink images (corresponding to two colors) obtained from the plate drums 231 and 232, respectively, are to be transferred. The blanket drum 233 is disposed so as to be capable of rotating in abutment with the plate drum 231 situated in the first printing position. The blanket drum 234 is disposed so as to be capable of rotating in abutment with the plate drum 232 situated in the second printing position.

The impression cylinder 235 has a diameter which is substantially ½ of those of the plate drums 231 and 232. A gripper unit (not shown) is provided on the cylindrical surface of the impression cylinder 235. The gripper unit is opened and closed by an open/close mechanism (not shown) with predetermined timing, so as to grip the leading end of a printing paper sheet having a size corresponding to the printing plate of each color (see FIG. 15A). The impression cylinder 235 is disposed so as to be capable of rotating in abutment with both of the blanket drums 233 and 234. An encoder 25 is provided on the rotation axis of the impression cylinder 235. The encoder 25 is generally employed to detect the rotary position of the impression cylinder 235. According to the present embodiment, in particular, the encoder 25 detects the transported position of the printing paper as retained by the impression cylinder 235.

The feed drum 236, which has substantially the same diameter as the impression cylinder 235, is disposed so as to be capable of rotating in abutment with the impression cylinder 235. A gripper unit (not shown) is affixed on the cylindrical surface of the feed drum 236, as also on the cylindrical surface of the impression cylinder 235. The gripper unit functions in synchronization with the gripper unit on the impression cylinder 235 to grip one sheet of printing paper which is fed from the feed unit 240 (described later). Then, as the feed drum 236 rotates, the gripper unit transports one sheet of printing paper over to the gripper unit on the impression cylinder 235.

The discharge drum 237 has substantially the same shape and structure as the feed drum 236. A gripper unit (not shown) on the discharge drum 237 grips the printing paper which is transported from the impression cylinder 235, in a manner similar to the gripper unit on the feed drum 236, except that the gripper unit transports the printing paper over to the discharge unit 241 (described later) as the discharge drum 237 rotates.

On a side face of each of the plate drums 231 and 232 in the aforementioned first and second printing positions, respectively, the blanket drums 233 and 234, the impression cylinder 235, the feed drum 236, and the discharge drum 237, a driving gear (not shown) having the same diameter as the respective drum is attached, such that the driving gears disposed on any two abutting drums engage each other. A print driving motor (not shown) is provided in the printing apparatus 2 to drive the respective driving gears, whereby the aforementioned seven drums rotate in synchronization.

As described above, the plate drums 231 and 232 and the blanket drums 233 and 234 have a circumference which is twice that of the impression cylinder 235. Therefore, the impression cylinder 235 makes two rotations while the plate drums 231 and 232 in the first and second printing positions and the blanket drums 233 and 234 make a single rotation. On the cylindrical surface of each of the plate drums 231 and 232, printing plates corresponding to two colors are stabilized at opposing positions which are apart by 180°. Accordingly, as the impression cylinder 235 makes two rotations while retaining printing paper thereon, the image im, the control strips cs, and the reference marks rm formed on the four printing plates (corresponding to four colors) retained by the plate drums 231 and 232 are transferred on the printing paper in superposition, thereby achieving four-color printing.

Two pairs of dampening water supply units 238 are provided in the printing mechanism 23, one pair being associated with each of the plate drums 231 and 232. Specifically, one pair of dampening water supply units 238 is disposed near the plate drum 231 in the first printing position for selectively supplying dampening water to the two printing plates (corresponding to two colors) retained by the plate drum 231. The other pair is disposed near the plate drum 232 in the second printing position for selectively supplying dampening water to the two printing plates (corresponding to two colors) on the plate drum 232. As mentioned earlier, these supply amounts are adjusted in accordance with control information Dcl (described later), which is generated by the print control section 21 based on the color density information Dct provided from the patch measurement device 27. In order to realize the above function, each dampening water supply unit 238 comprises a water bin, dampening water rollers, and a cam mechanism, although not shown in detail. The water bin stores dampening water. The dampening water rollers take up dampening water from the water bin, and supply it to a corresponding printing plate retained by the plate drum 231 or 232. When supplying dampening water to the printing plate, the cam mechanism moves the dampening water roller abutting with the printing plate from the position retracted away from the plate drum 231 or 232 to a position neighboring them. Furthermore, after the supply of dampening water has been completed, the cam mechanism retracts the dampening water roller abutting with the printing plate from the position neighboring the plate drum 231 or 232 back to the retracted position. In the case where the printing plates used are of a type which does not require dampening water, the dampening water supply units 238 can be omitted.

Two pairs of ink supply units 239 are provided in the printing mechanism 23, one pair being associated with each of the plate drums 231 and 232. Specifically, one pair of ink supply units 239 is disposed near the plate drum 231 in the first printing position for selectively supplying ink to the two printing plates (corresponding to two colors) retained by the plate drum 231; for example, this pair of ink supply units 239 may respectively supply inks of B (black) and M (magenta) to the printing plates on the plate drum 231. The other pair is disposed near the plate drum 232 in the second printing position for selectively supplying ink to the two printing plates (corresponding to two colors) on the plate drum 232; for example, this other pair of ink supply units 239 may respectively supply inks of C (cyan) and Y (yellow) to the printing plates on the plate drum 231. In order to realize the above function, each ink supply unit 239 comprises an ink duct, a plurality of ink rollers, and a cam mechanism, although not shown in detail. The ink duct, which stores an ink of a predetermined color, supplies the ink in a number of regions on the printing plate along the second printing direction, by way of a plurality of ink rollers. As mentioned earlier, these supply amounts are adjusted in accordance with control information Dcl (described later), which is generated by the print control section 21 based on the color density information Dct provided from the patch measurement device 27. The ink rollers knead the ink supplied from the ink duct and supplies it to the printing plate. When supplying ink to the printing plate, the cam mechanism moves the ink rollers abutting with the printing plate from the position retracted away from the plate drum 231 or 232 to a position neighboring them. Furthermore, after the supply of ink has been completed, the cam mechanism retracts the ink rollers abutting with the printing plate from the position neighboring the plate drum 231 or 232 back to the retracted position.

Note that some of the dampening water supply units 238 are arranged so as to be capable of escaping the moving paths of the plate drums 231 and 232, in order to allow the plate drums 231 and 232 to move from the first and second printing positions, respectively, to the image recording position. The same is also true of some of the ink supply units 239.

The feed unit 240 takes out each sheet of printing paper from a pile of unused printing paper, and passes it to the feed drum 236. Since printing for one sheet of printing paper occurs with every two rotations of the impression cylinder 235 (as described above), the feed unit 240 passes one sheet of printing paper to the feed drum 236 with every two rotations of the feed drum 236 according to the present embodiment. The feed unit 240 includes a printing paper sensor 24 for optically detecting the passage of printing paper. The printing paper sensor 24 is generally employed to detect stuck paper or accidental taking of two sheets of paper. According to the present embodiment, based on the result of detection by the printing paper sensor 24, the feed unit 240 can determine whether printing paper is being supplied to the impression cylinder 235 or the feed drum 236, or no printing paper is being supplied to the impression cylinder 235 or the feed drum 236.

The discharge unit 241 receives the printing paper which has undergone printing (hereinafter referred to as a "printed material S") from the discharge drum 237, and allows the printed materials S to be piled up in itself.

Figure 4:
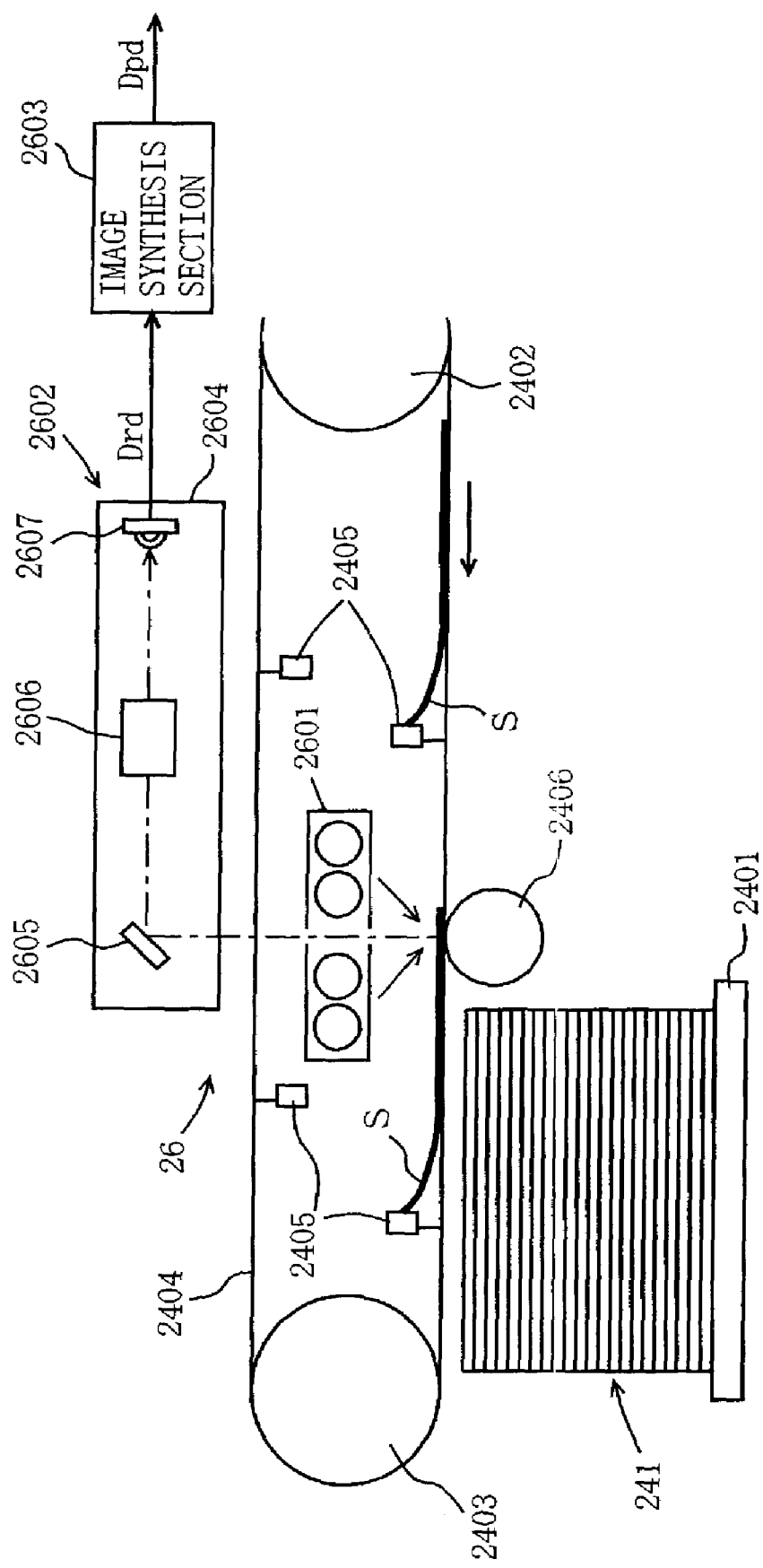
FIG. 4 is a schematic side view illustrating the detailed structures of a discharge unit 241 shown in FIG. 3 and an imaging device 26.

Hereinafter, the details of the discharge unit 241 as well as the imaging device 26 will be described with reference to FIG. 4. FIG. 4 is a schematic side view illustrating the detailed structures of the discharge unit 241 shown in FIG. 3 and the imaging device 26 according to the present embodiment of the present invention. The discharge unit 241 comprises a discharge base 2401, two pairs of gears 2402 and 2403, two endless chains 2404, and a plurality of gripper units 2405. Note that FIG. 4 only shows one of the gears 2402, one of the gears 2403, and one of the chains 2404 due to its nature as a side view. The discharge base 2401 is a palette-like member on which a number of printed materials S can be piled up. The discharge base 2401 is moved in up and down directions by an elevation mechanism (not shown). Specifically, the discharge base 2401 is gradually lowered as more printed materials S are piled up. Since this allows the topmost printed material S in the pile to be maintained at a substantially constant height, the discharging of printed materials S can be made smooth. The two gears 2402 are respectively affixed on the opposing side faces of the discharge drum 237, so as to have the same rotation axis as the discharge drum 237. The gears 2403 have a common rotation axis, which is in parallel to the rotation axis of the discharge drum 237 and extends above the discharge base 2401. Each chain 2404 has a length equal to an integer multiple of the circumference of the discharge drum 237, and is wound around one of the gears 2402 and one of the gears 2403 that are provided on the same side.

The gripper unit 2405 is fixed astride the two chains 2404. On the chain 2404, any two consecutive gripper units 2404 are provided at a fixed distance which is substantially equal to the circumference of the discharge drum 237. Each gripper unit 2404 has claws which are opened or closed to grip a printed material S. The claws are arranged so as to open or close in synchronization with the gripper unit (not shown) on the discharge drum 237 by a cam mechanism (not shown), and receive the printed material S which is transported from the discharge drum 7. The rotations of the two pairs of gears 2402 and 2403 drive the chains 2404 from the discharge drum 237 toward the discharge base 2401. Through this action, each gripper unit 2405 transports a printed material S, and as the claws open above the discharge base 2401, allows the printed material S to be piled on the discharge base 2401.

Since each gripper unit 2405 in the discharge unit 241 only grips one end of the printed material S, each printed material S is transported without its trailing end being fixed, which might allow a recoil of the printed material S to occur. Therefore, according to the present embodiment, in order to minimize the recoil of the printed material S, a suction roller 2406 for controlling the transportation of the printed material S is provided between the discharge drum 237 and the discharge base 2401. A large number of minute suction apertures are provided on the outer surface of the suction roller 2406, which are connected to a vacuum pump (not shown). The suction roller 2406 is disposed in such a manner that its axis extends in parallel to each gripper unit 2405 bridging the two chains 2404, and that the upper end of the suction roller 2406 is positioned at substantially the same height as the lower ends of the chains 2404. The suction roller 2406 is arranged so as to be driven to rotate in accordance with the travelling speed of the gripper unit 2404, or simply capable of freely rotating. Thus, when travelling over the suction roller 2406, each printed material S moves while being sucked onto the surface of the suction roller 2406. As a result, the printed material S is prevented from recoiling at least when travelling over the suction roller 2406. Instead of the suction roller 2406, a suction plate may be employed which sucks the printed material S onto a planar surface.

The imaging device 26 comprises a lighting unit 2601, two imaging units 2602, and an image synthesis section 2603. Note that, due to its nature as a side view, FIG. 4 only shows one of the two imaging units 2602, which are disposed along a direction perpendicular to the plane of the drawing. The lighting unit 2601 illuminates each printed material S which is transported by the action of the chains 2404. More specifically, the lighting unit 2601 is disposed above the suction roller 2406 and between the chains 2404. The lighting unit 2601 comprises a plurality of linear light sources for illuminating a printed material S which is situated on the suction roller 2406. A slit is formed in the central portion of each linear light source, such that the reflected light from the printed material S (which originates from the linear light source) passes through the slit to enable image capturing.

Figure 15B:
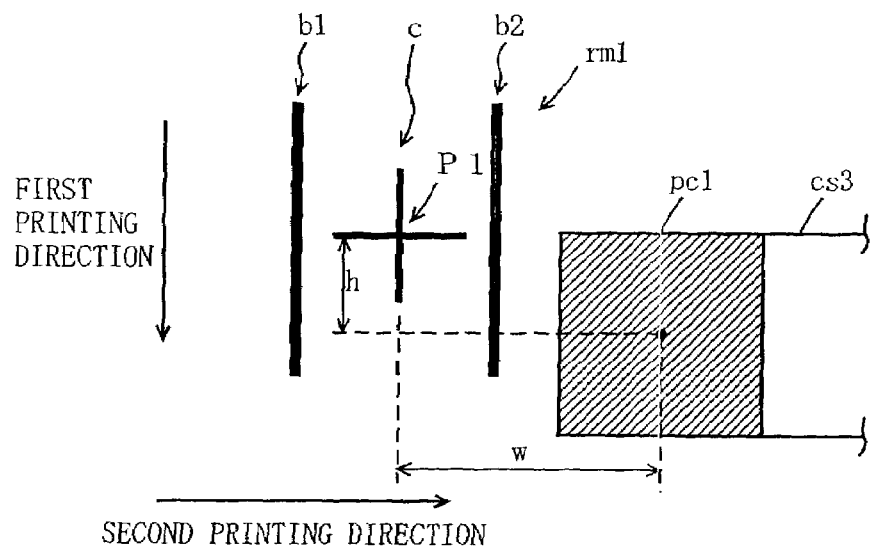

Each imaging unit 2602 captures an image of the illuminated printed material S through the slit in the lighting unit 2601, thereby generating printed-image data Dpd (hereinafter also referred to as "imaged data") representing the image im, the control strips cs, and the reference marks rm (see FIGS. 15A and 15B). Throughout the present specification, image capturing in this sense may also be simply referred to as "imaging". In order to realize the above function, the imaging unit 2602 comprises a housing 2604 for light-shielding and dust prevention purposes, a mirror 2605, a lens 2606, and a CCD line sensor 2607. The mirror 2605, the lens 2606, and the CCD line sensor 2607 are accommodated within the housing 2604. The mirror 2605 reflects the light which has passed through the slit toward the lens 2606. The reflected light from the mirror 2605 is converged by the lens 2606 so as to be received by the CCD line sensor 2607. The CCD line sensor 2607 reads images with respect to the three colors of RGB (i.e., red, green, and blue). According to the present embodiment, as the printed material S is transported, the printed material S is sequentially read in a line-by-line manner. Thus, by the time the entire (i.e., from the leading end to the trailing end) printed material S has passed immediately under the lighting unit 2601, the CCD line sensor 2607 will have produced read-out image data Drd, from which printed-image data Dpd corresponding to one printed material S is generated.

In the present embodiment, the two imaging units 2602 are disposed along a direction perpendicular to the plane of the drawing of FIG. 4, as mentioned above. The imaging units 2602 capture images of two split portions of the printed material S to generate respective read-out image data Drd, the division being made along the second printing direction.

Figure 5:
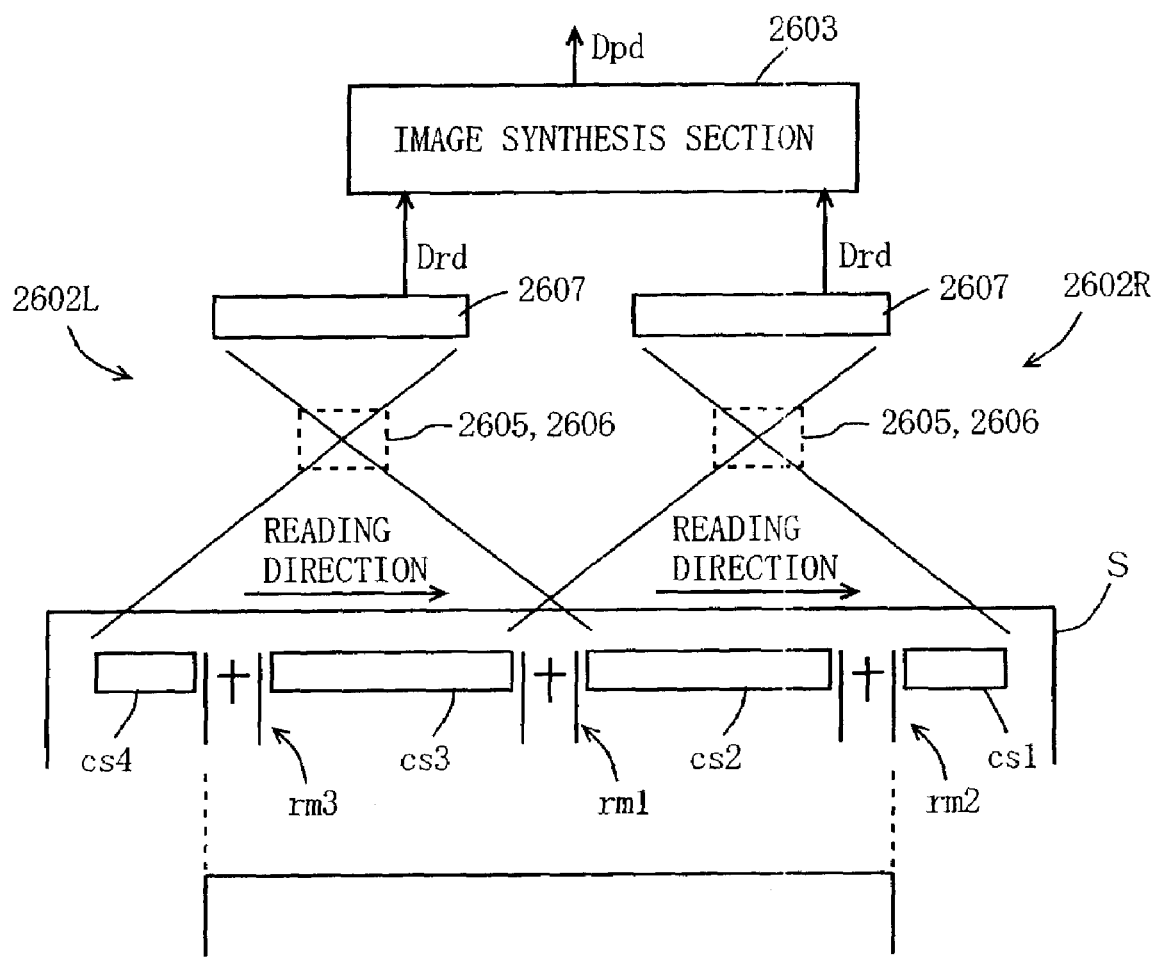
FIG. 5 is a diagram for specifically describing two imaging units 2602 shown in FIG. 4.

FIG. 5 is a diagram for specifically describing the two imaging units 2602 shown in FIG. 4. For conciseness, the imaging unit appearing on the left-hand side of FIG. 4 will hereinafter be referred to as the "imaging unit 2602L" and the other imaging unit as the "imaging unit 2602R". As described above, the imaging regions of the imaging unit 2602L and the 2602R generally correspond to the left-side portion and the right-side portion of the printed material S, respectively. Both imaging regions are arranged so as to overlap preferably in the neighborhood of a center line (extending parallel to the first printing direction of the printed material S). Moreover, the printing apparatus 2 is arranged so as to print the reference marks rm1 to rm3 at positions which will be safely within a printed material S having a marginal (i.e., minimum usable) width. The image-to-print data Dpg is generated in such a manner that the reference mark rm1 will be positioned in the aforementioned overlapping region.

On the other hand, the reference marks rm2 and rm3 are printed near the left and right ends of the printed material S, so that the reference marks rm1 and rm2 will be imaged by the imaging unit 2602L and that the reference marks rm1 and rm3 will be imaged by the imaging unit 2602R. Thus, each of the imaging units 2602L and 2602R images two reference marks rm. Based on such detection of the positions of the reference marks rm1 to rm3, it is possible to ascertain the approximate positions of the control strips cs1 to cs4 because they are supposed to be printed at predetermined positions relative to the detected reference marks rm1 to rm3. In order to be able to image a single printed material S by means of the imaging units 2602L and 2602R, the respective CCD line sensors 2607 in the imaging units 2602L and 2602R are oriented so that their reading directions coincide.

The image synthesis section 2603 receives the read-out image data Drd from the two imaging units 2602, and through position matching based on the reference mark rm1, synthesizes the read-out image data Drd which have been read by the imaging units 2602L and 2602R to generate printed-image data Dpd representing a single printed material S. Furthermore, the image synthesis section 2603 sends the generated printed-image data Dpd to the patch measurement device 27.

The patch measurement device 27 (FIG. 1) measures the color density of the patches composing each control strip cs printed on the printing paper.

Figure 6:
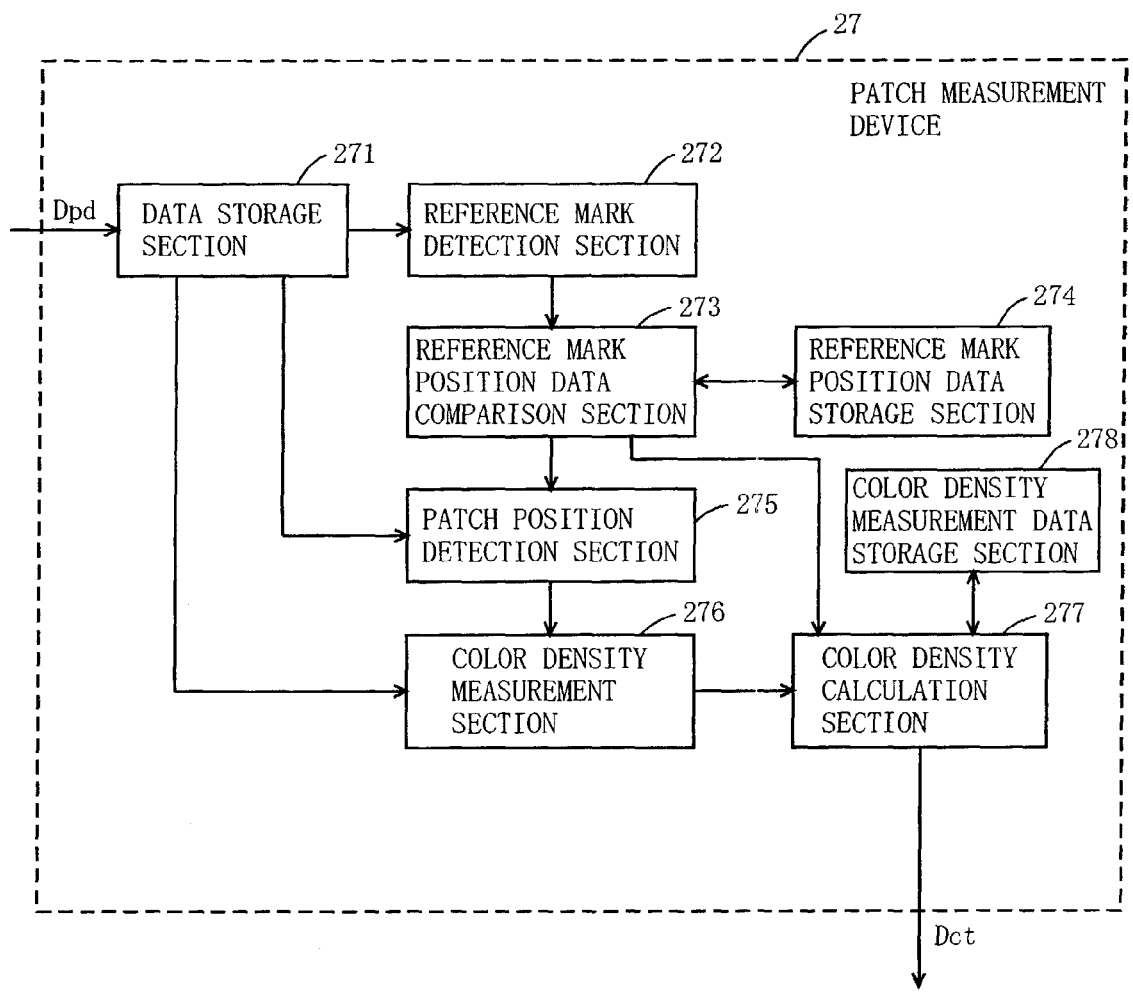
FIG. 6 is a functional block diagram illustrating the detailed structure of the patch measurement device 27 shown in FIG. 1.

FIG. 6 is a functional block diagram illustrating the detailed structure of the patch measurement device 27. In FIG. 6, the patch measurement device 27 comprises a data storage section 271, a reference mark detection section 272, a reference mark position data comparison section 273, a reference mark position data storage section 274, a patch position detection section 275, a color density measurement section 276, and a color density calculation section 277. The data storage section 271 stores the printed-image data Dpd which is sent from the image synthesis section 2603. The reference mark detection section 272 performs image processing for the printed-image data Dpd stored in the data storage section 271 to detect the positions of all cross points P in the reference marks rm and generate position data thereof (see FIGS. 15A and 15B). In other words, in the case where the printed-image data Dpd contains three reference marks rm1 to rm3, the reference mark detection section 272 detects the positions of the crosspoints P1 to P3 of the respective reference marks rm1 to rm3. The detection of reference marks rm in the printed-image data Dpd performed by the reference mark detection section 272 is typically realized through image processing such as a pattern matching process. Since such image processing is known, no further explanation thereof will be given in the description of the present embodiment.

With respect to the position data of the crosspoint P of each reference mark rm detected by the reference mark detection section 272, the reference mark position data comparison section 273 determines whether the position data of the crosspoint P as detected by the reference mark detection section 272 is valid or not, based on a comparison with the past position data of the same crosspoint P which is already stored in the reference mark position data storage section 274. When determining that the detected position data is valid, the reference mark position data comparison section 273 instructs the patch position detection section 275 to detect the position of an associated patch, and causes the valid position data to be stored onto a position data table in the reference mark position data storage section 274, in the form of active position data and static position data. On the other hand, when determining that the detected position data is invalid, the reference mark position data comparison section 273 establishes that the detection of reference mark rm has failed, and therefore instructs the color density calculation section 277 to calculate past color density information, and causes the invalid position data to be stored onto the position data table in the reference mark position data storage section 274 as active position data. The details of the position data table stored in the reference mark position data storage section 274 and the active and static position data will be described below.

Based on the instruction from the reference mark position data comparison section 273, the patch position detection section 275 detects a patch whose color density is to be measured. Using the deployed position information Dpn from the print control section 21, the patch detection is performed relative to the position of the crosspoint P in the printed-image data Dpd (stored in the data storage section 271) as detected by the reference mark detection section 272. With respect to the detected patch, the patch position detection section 275 extracts pixels composing the patch and its surrounding periphery from the printed-image data Dpd stored in the data storage section 271, and applies predetermined image processing thereto, thereby finalizing the position of the patch. Typically, the patch position detection section 275 finalizes the patch position to be the center of the patch. Although the image processing used for the finalization of the patch position may be based on various techniques such as analyzing the pixel distribution, such techniques do not constitute a feature of the present invention, and are therefore omitted from the description in the present embodiment.

The color density measurement section 276 retrieves the pixels located at the patch position as detected by the patch position detection section 275 from the data storage section 271, and generates color density measurement data (e.g., density and/or dot percentage) of the printed patch at the patch position. Moreover, the color density measurement section 276 sends the color density measurement data to the color density calculation section 277.

Based on the color density measurement data sent from the color density measurement section 276 or the instruction from the reference mark position data comparison section 273, the color density calculation section 277 calculates color density information Dct. Specifically, if the color density measurement data is sent from the color density measurement section 276, the color density information Dct is calculated by using the color density measurement data and the past color density measurement data stored in the color density measurement data storage section 278. If an instruction is issued from the reference mark position data comparison section 273, the color density information Dct is calculated by only using the past color density measurement data stored in the color density measurement data storage section 278. The method for calculating the color density information Dct will be described later. The color density calculation section 277 causes the color density measurement data to be stored onto a color density measurement data table (described later) in the color density measurement data storage section 278. Furthermore, the color density calculation section 277 sends the color density information Dct thus calculated to the print control section 21. Based on the color density information Dct from the patch measurement device 27, as described above, the print control section 21 generates and outputs control information Dcl, in accordance with which the supply amounts of ink and/or dampening water used in the aforementioned printing mechanism 23 are adjusted. Thus, the amount of ink supplied from the ink supply unit 239 and/or the amount of dampening water supplied from the dampening water supply unit 238 are automatically controlled. The print control section 21 outputs the color density information Dct to the display device 28 as necessary.

Referring back to FIG. 1, the display device 28, which is composed of a display device (e.g., liquid crystal), displays color density information of the patches in given a control strip cs and/or an alert message to an operator, on the basis of the color density information Dct sent from the print control section 21.

Figure 7:
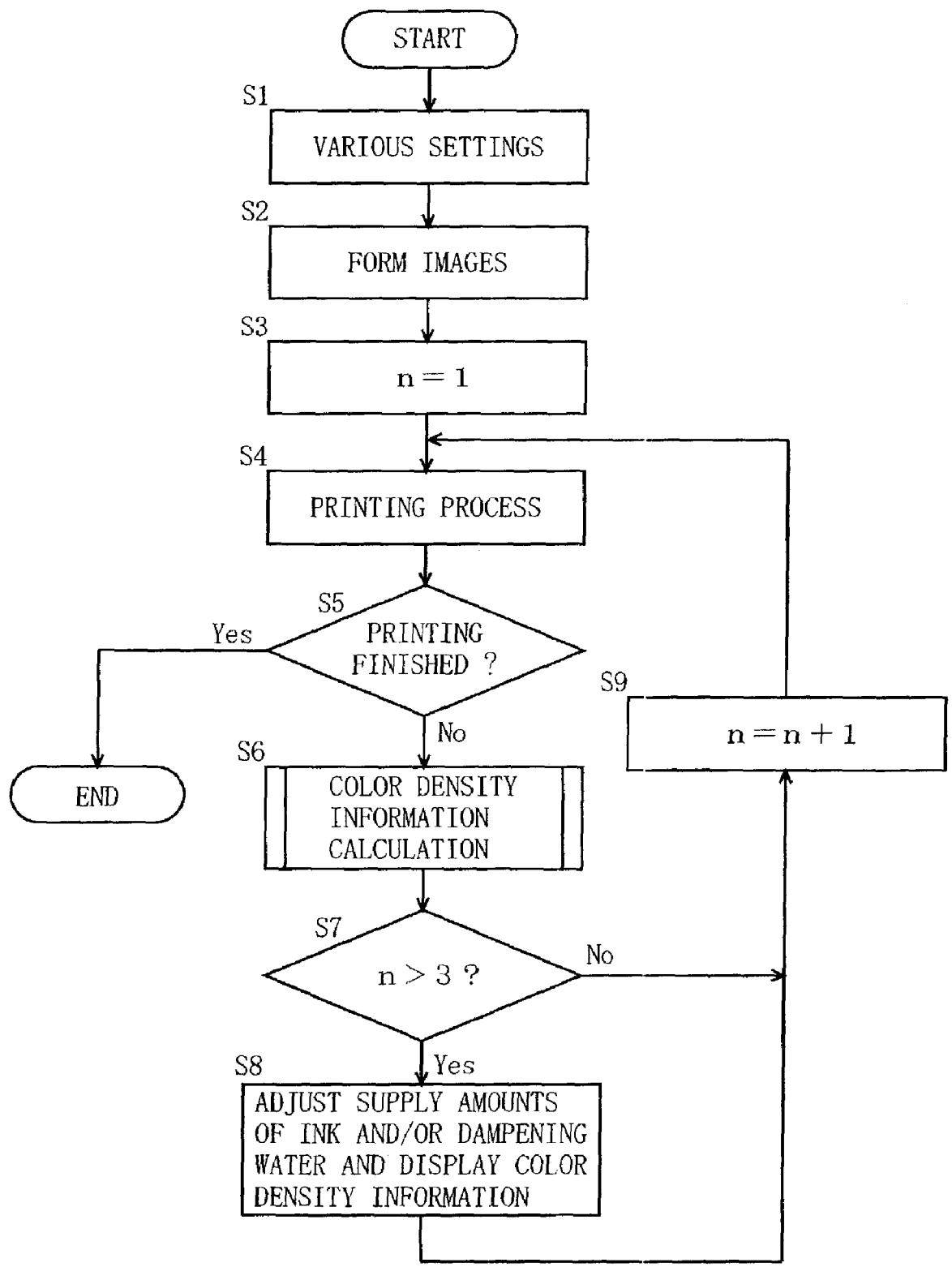
FIG. 7 is a flowchart illustrating a flow of control by the printing system shown in FIG. 1 up to the completion of a printing process.

Next, the overall operation of the printing system shown in FIG. 1 will be described with reference to FIG. 7. FIG. 7 is a flowchart illustrating a flow of control by the printing system up to the completion of a printing process.

The operator operates the terminal 1 to make various settings in the printing apparatus 2 (step S1). Typically, image-to-print data Dpg to be currently used and the number of printed materials S to be produced are set at step S1. Furthermore, not only the image-to-print data Dpg but also the aforementioned deployed position information Dpn are transmitted from the terminal 1 to the print control section 21 in the printing apparatus 2. Alternatively, the transmission of the image-to-print data Dpg may be performed in real time, i.e., in pace with the image formation on printing plates.

Next, the printing apparatus 2 forms an image im, control strips cs and reference marks rm represented by the currently received image-to-print data Dpg on printing plates (step S2). At step S2, either the plate drum 231 or 232 is moved to the image recording position, and an unexposed printing plate which has been transported from the printing plate supply section 221 is mounted on the plate drum 231 or 232 at the image recording position. Thereafter, at the image recording section 222, an image exposure is performed on the printing plate mounted on the rotating plate drum 231 or 232 by using a laser light beam which is modulated in accordance with the image-to-print data Dpg received from the print control section 21. In other words, the image im, the control strips cs and the reference marks rm are formed on the printing plates. After the exposure is completed, the development section 223 performs a development process for the exposed printing plates in the aforementioned manner. After the development process is completed, the plate drum 231 or 232 which is currently in the image recording position is retracted to the first or second printing position. Thereafter, the plate drum 232 or 231 currently situated in the second or first printing position is moved to the image recording position, and exposure and development processes are performed for the printing plates mounted on the plate drum 232 or 231 in a manner similar to that described above. Thus, the prepress process is completed.

Next, the print control section 21 of the printing apparatus 2 sets an initial value n=1 for a count value n (described later), which represents the number of times color density information has been calculated (step S3). More specifically, the count value n is set in the patch measurement device 27 in accordance with an instruction from the print control section 21. The position data table stored in the reference mark position data storage section 274 and the color density measurement data table stored in the color density measurement data storage section 278 are initialized with the initial value n=1. Each time the count value n is updated, the position data table stored in the reference mark position data storage section 274 and the color density measurement data table stored in the color density measurement data storage section 278 are updated.

Next, the printing apparatus 2 performs a printing process using the printing plates which have been prepressed at step S2 (step S4). More specifically, the dampening water supply unit 238 supplies predetermined amounts of dampening water to the respective printing plates on the plate drums 231 and 232, and then the ink supply unit 239 supplies predetermined amounts of inks of corresponding colors to the printing plates. The ink images on the respective printing plates are transferred onto the blanket drums 233 and 234. On the other hand, the feed unit 240 supplies one sheet of printing paper to the feed drum 236 with the aforementioned timing. The supplied printing paper is passed from the feed drum 236 to the impression cylinder 235. While the impression cylinder 235 retaining the printing paper makes two rotations, ink images having been transferred onto the blanket drums 233 and 234 are transferred onto the printing paper. Thereafter, the printing paper is passed from the impression cylinder 235 to the discharge drum 237, and piled as a completed printed material S on the discharge base 2401 in the discharge unit 241.

Next, the printing apparatus 2 determines whether or not the number of printed materials S produced has reached the number which was set at step S1 (step S5). If the predetermined number has been reached, the process shown in FIG. 7 is completed. If the predetermined number has not been reached, the printing apparatus 2 calculates color density information by means of the patch measurement device 27, for a predetermined number of sampled sheets (e.g., 5 sheets/time) (step S6). At step S6, the aforementioned color density information Dct is generated, and sent to the print control section 21. Then, the print control section 21 determines whether the count value n is greater than 3 or not (step S7). If the count value n>3, the print control section 21 proceeds to step S8. If the count value n≦3, the print control section 21 proceeds to step S9.

At step S8, based on the color density information Dct sent from the patch measurement device 27, the print control section 21 adjusts the supply amounts of ink and/or dampening water as described above, and outputs the color density information Dct to the display device 28 in order to notify the color density information Dct to the operator. Then, the print control section 21 updates the count value n (which represents the number of times color density information Dct has been calculated), such that n=n+1 (step S9), and returns to step S4.

Figure 8:
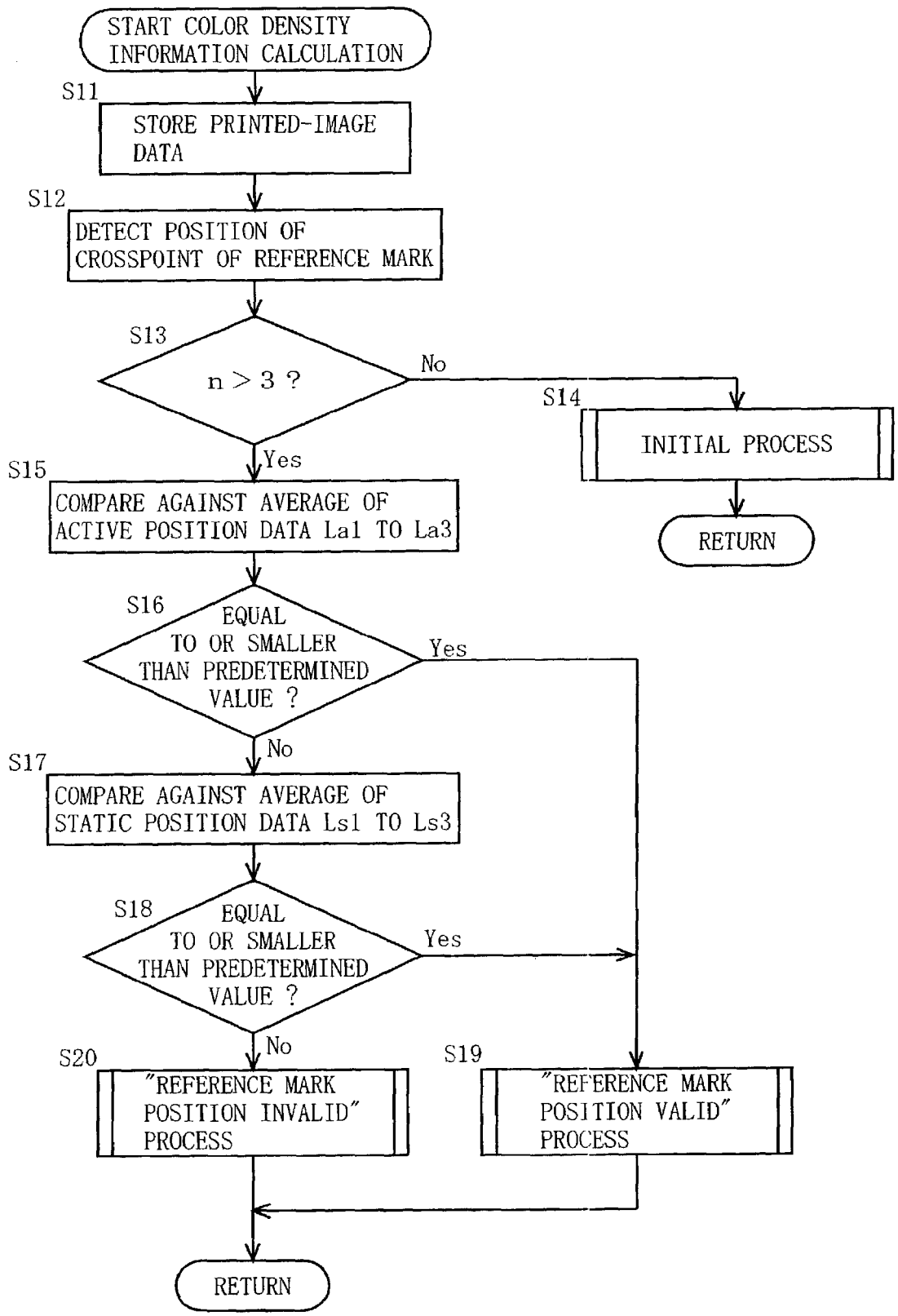
FIG. 8 is a flowchart illustrating the detailed procedure of the process performed at step 6 in FIG. 7.

Next, the detailed processing procedure of step S6 will be described with reference to FIG. 8. FIG. 8 is a flowchart illustrating the detailed procedure of the process performed at step 6 in FIG. 7.

Referring to FIG. 8, the imaging device 26 generates printed-image data Dpd and causes it to be stored to the data storage section 271 of the patch measurement device 27 (step S11), as already described with reference to FIGS. 4 and 5.

Once step S11 is finished, the reference mark detection section 272 of the patch measurement device 27 performs image processing such as a pattern matching process for the printed-image data Dpd stored in the data storage section 271, thereby detecting the position of the crosspoint P of a reference mark rm (FIGS. 15A and 15B), and generates the position data thereof (step S12). In the case where a plurality of reference marks rm are printed, the position data of all reference marks rm are detected at step S12. The patch position detection described below is preferably performed relative to the closest one of the reference marks rm, in order to minimize the error in the patch detection by reducing the distance of the patch from the reference mark rm which is referred to.

Next, the reference mark position data comparison section 273 of the patch measurement device 27 determines whether the current count value n (which represents the number of times the color density information has been calculated) is greater than 3 or not (step S13). If n≦3, the process proceeds to an initial process of step S14.

Figure 9:
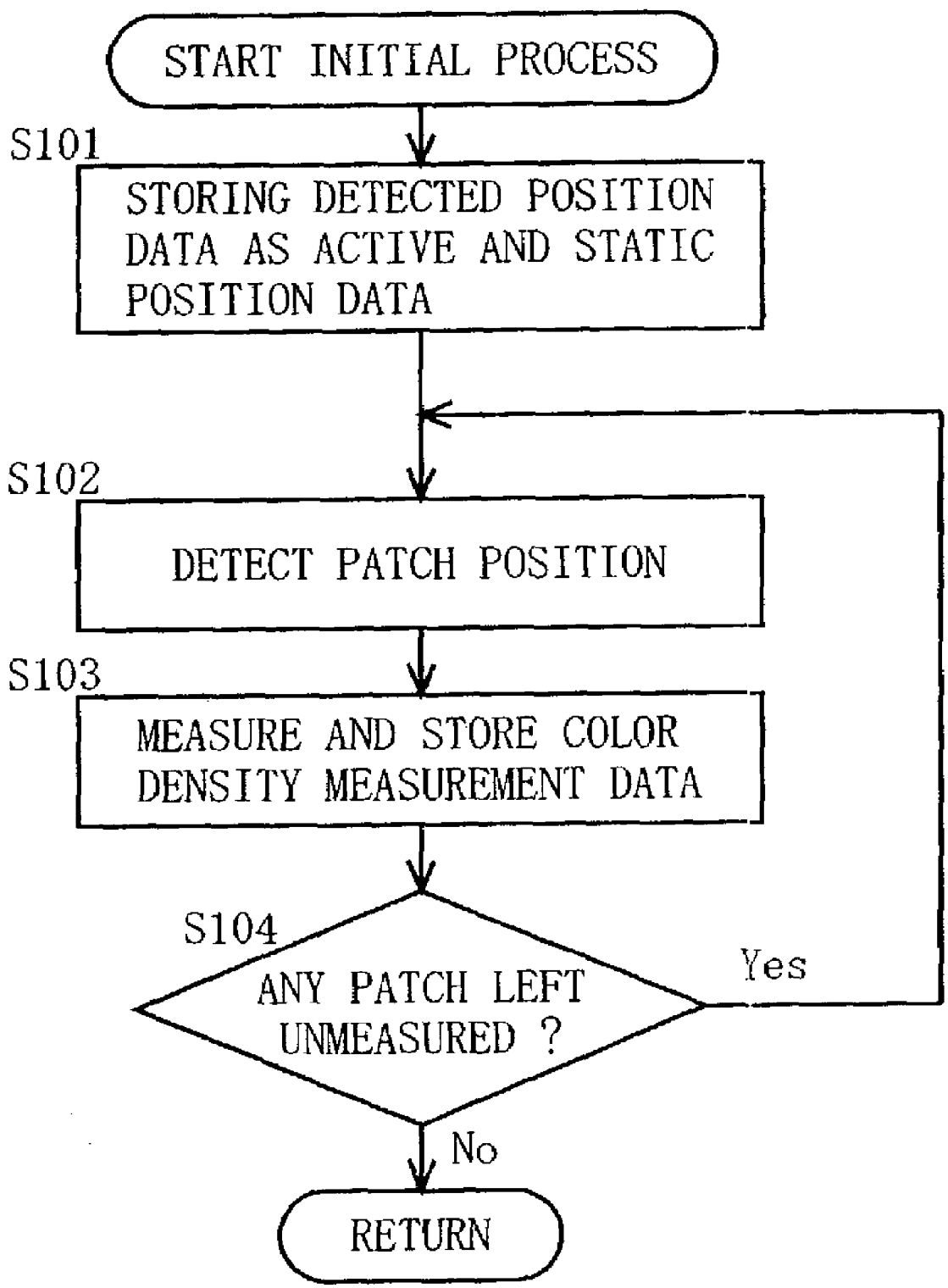
FIG. 9 is a flowchart illustrating the detailed procedure of the process performed at step S14 in FIG. 8.

Next, the detailed processing procedure of step S14 will be described with reference to FIG. 9. FIG. 9 is a flowchart illustrating the detailed procedure of the process performed at step 14 in FIG. 8.

In FIG. 9, the reference mark position data comparison section 273 causes the position data of the crosspoint P of the reference mark rm detected at step S12 to be stored, as active position data and static position data, onto the position data table in the reference mark position data storage section 274 (step S101), and proceeds to the next step S102. In the case where there is a plurality of reference marks rm, the reference mark position data comparison section 273 may cause the position data of at least one of the reference marks rm to be stored onto the position data table in the reference mark position data storage section 274 as the position data of a "predetermined" reference mark rm. Alternatively, the position data of all of the plurality of reference marks rm may be stored, in which case the below-described determination shall be performed with respect to each of the reference marks rm. In the following description, it is assumed that the position data of a reference mark (e.g., rm1) which is disposed in a substantial center along the second printing direction is stored in the reference mark position data storage section 274.

As used herein, the "active position data" is position data which is updated in an active manner; the most-recent active position data is updated every time the color density information calculation (step S6) is carried out. On the other hand, the "static position data" is position data which is updated in a static manner; the static position data is updated only when the detected position data is determined as valid in a manner described below. During the initial process shown in step S14, however, the reference mark position data comparison section 273 always causes the position data detected at step S12 to be stored in the position data table in the reference mark position data storage section 274 as active position data and static position data.

Now, referring to FIG. 10, the position data table which is set in the reference mark position data storage section 274 will be described. FIG. 10A illustrates an example of a position data table which is set in the reference mark position data storage section 274.

In FIG. 10A, three pieces of active position data La1 to La3 and three pieces of static position data Ls1 to Ls3 are written in the position data table which is set in the reference mark position data storage section 274. Hereinafter, the respective areas (on the memory) of the position data table in which the active position data La1 to La3 are written will be referred to as the "first to third storage areas"; and the respective areas (on the memory) of the position data table in which the static position data Ls1 to Ls3 are written will be referred to as the "fourth to sixth storage areas". Also in the position data table, a count value n, which represents the number of times the reference mark detection section 272 has detected each piece of active position data (La1 to La3) or static position data (Ls1 to Ls3), is written in the same storage area, in association with the respective position data. Hereinafter, the count values n representing the numbers of times which the reference mark detection section 272 has detected the active position data La1 to La3 will be denoted as "count values na1 to na3", respectively; and the count values n representing the numbers of times which the reference mark detection section 272 has detected the static position data Ls1 to Ls3 will be denoted as "count values ns1 to ns3", respectively. Note that the count values n written in the position data table are of the relationships na1>na2>na3 and ns1>ns2>ns3. In other words, the active position data La1 and the static position data Ls1 are the most-recent position data. It will be appreciated that any of the count values na1 to na3 may coincidentally be equal to any of the count values ns1 to ns3.

Referring back to FIG. 9, at step S101 above, the position data table is updated by the reference mark position data comparison section 273 by storing the position data of the crosspoint P of the reference mark rm1 as detected at step S12 as the most-recent active position data La1 and static position data Ls1, and by storing the current count value n as the count values na1 and ns1. If any other active position data or static position data is already stored in the position data table, the reference mark position data comparison section 273 updates the already-written active position data and static position data in FIFO (First-in First-out) fashion. Specifically, in the third storage area of the position data table, the reference mark position data comparison section 273 writes the active position data La2 and the count value na2 (which are written in the second storage area) in place of the already-written active position data La3 and count value na3, and in the second storage area, writes the active position data La1 and the count value na1 (which are written in the first storage area) in place of the already-written active position data La2 and count value na2. Furthermore, in the sixth storage area of the position data table, the reference mark position data comparison section 273 writes the static position data Ls2 and the count value ns2 (which are written in the fifth storage area) in place of the already-written static position data Ls3 and count value ns3, and in the fifth storage area, writes the static position data Ls1 and the count value ns1 (which are written in the fourth storage area) in place of the already-written static position data Ls2 and count value ns2. Then, the update of the position data table is completed when the reference mark position data comparison section 273 writes the most-recent active position data La1 and static position data Ls1 detected at step S12 and their respective count values na1 and ns1 in the first and fourth storage areas of the position data table.

Next, at step S102, the patch position detection section 275 selects a patch to be measured from among the plurality of patches in a control strip Cs, and by using the deployed position information Dpn from the print control section 21, extracts data of a relative position (hereinafter referred to as "relative position data") of the patch from the reference mark rm which lies closest to the patch. Then, by using the extracted relative position data, the patch position detection section 275 detects the patch to be measured within the printed-image data Dpd stored in the data storage section 271, in reference to the position data of the reference mark rm detected at step S12.

For example, in the case where the patch pc1 (FIGS. 15A and 15B) is to be detected at step S102 above, the patch position detection section 275 first extracts, as the relative position data, the patch distances h and w (see FIG. 15B) from the closest reference mark rm1 in the deployed position information Dpn. Then, from the printed-image data Dpd stored in the data storage section 271, the patch position detection section 275 finalizes the position of the patch pc1 in the printed-image data Dpd based on the relative position data and the position data of the reference mark rm1, and extracts a pixel at the position and its peripheral pixels from the printed-image data Dpd stored in the data storage section 271, thereby detecting the patch pc1 through predetermined image processing. Typically, the patch position detection section 275 detects the center of the patch pc1 through image processing, and sets this position to be the color density measurement position for the patch pc1. Although the image processing used for the finalization of the measurement positions may be based on various techniques such as analyzing the pixel distribution, such techniques do not constitute a feature of the present invention, and are therefore omitted from the description in the present embodiment.

Next, the color density measurement section 276 retrieves the predetermined pixels of the patch as detected by the patch position detection section 275 from the printed-image data Dpd stored in the data storage section 271, and generates color density measurement data Da by measuring the color density (e.g., density and/or dot percentage) of the printed patch. The color density measurement section 276 outputs the color density measurement data Da to the color density calculation section 277. The color density calculation section 277 causes the color density measurement data Da outputted from the color density measurement section 276 to be stored to the color density measurement data table in the color density measurement data storage section 278, in association with the patch to be measured and the current count value n (step S103).

Referring back to FIGS. 10A and 10B, the color density measurement data table which is set in the color density measurement data storage section 278 will be described. FIG. 10B illustrates an example of the color density measurement data table which is set in the color density measurement data storage section 278. Although a different color density measurement data table is to be set for a different patch in the control strip cs, the following description will be directed only to the color density measurement data table which is set with respect to the patch pc1.

In FIG. 10B, three pieces of color density measurement data Da1 to Da3 are written in the color density measurement data table which is set in the color density measurement data storage section 278. Hereinafter, the respective areas (on the memory) of the color density measurement data table in which the color density measurement data Da1 to Da3 are written will be referred to as the "seventh to ninth storage areas". Also in the color density measurement data table, a count value n, which represents the number of times color density measurement section 276 has measured each piece of color density measurement data (Da1 to Da3), is written in the same storage area, in association with the respective color density measurement data. Hereinafter, the count values n representing the numbers of times which the color density measurement section 276 has detected the color density measurement data Da1 to Da3 will be denoted as "count values na1 to na3", respectively. Note that the count values n written in the color density measurement data table are of the relationship na1>na2>na3. In other words, the color density measurement data Da1 is the most-recent color density measurement data.

Referring back to FIG. 9, in the case where the patch pc1 (FIGS. 15A and 15B) has been measured at step S103 above, the color density measurement data table is updated by the color density calculation section 277 by storing the color density measurement data Da of the patch pc1 as measured by the color density measurement section 276 as the most-recent color density measurement data Da1, and by storing the current count value n as the count value na1. If any other color density measurement data is already stored in the color density measurement data table, the color density calculation section 277 updates the already-written color density measurement data in FIFO fashion. Specifically, in the ninth storage area of the color density measurement data table, the color density calculation section 277 writes the color density measurement data Da2 and the count value na2 (which are written in the eighth storage area) in place of the already-written color density measurement data Da3 and count value na3, and in the eighth storage area, writes the color density measurement data Da1 and the count value na1 (which are written in the seventh storage area) in place of the already-written color density measurement data Da2 and count value na2. Then, the update of the color density measurement data table is completed when the color density calculation section 277 writes the most-recent color density measurement data Da1 measured by the color density measurement section 276 and the count value na1 in the seventh storage area of the color density measurement data table.

Next, the patch measurement device 27 determines whether or not there are any patches whose color density measurement data has not been measured yet (step S104). If there are any such patches, the control returns to step S102 to obtain color density measurement data of an unmeasured patch. On the other hand, if it is determined that the measurement has been completed for all patches, the patch measurement device 27 ends the procedure of FIG. 9.

The initial process at step S14 is performed while the count value n≦3. In other words, by executing step S14 three times as an initial process, the active position data and static position data during the initial process (n=1 to 3) are stored in the position data table, and color density measurement data of all patches during the initial process (n=1 to 3) are stored in the color density measurement data table.

Referring back to FIG. 8, if the current count value n>3 at step S13 (where n represents the number of times the color density information has been calculated), the reference mark position data comparison section 273 of the patch measurement device 27 proceeds to step S15.

At step S15, the reference mark position data comparison section 273 compares the position data of the reference mark rm1 which has been detected at step S12 above against an average value $La_{Ave}$ of the active position data La1 to La3 written in the position data table (see FIG. 10A) in the reference mark position data storage section 274, to obtain a difference between the two values (step S15). If the result of the comparison of step S15 indicates a difference which is equal to or less than a predetermined value (e.g., five pixels) (step S16), the reference mark position data comparison section 273 determines that the position data of the reference mark rm1 which has been detected at step S12 above is valid, and proceeds to next step S19. On the other hand, if the result of the comparison of step S15 does not satisfy the predetermined value (step S16), the reference mark position data comparison section 273 proceeds to next step S17.

At step S17, the reference mark position data comparison section 273 compares the position data of the reference mark rm1 which has been detected at step S12 above against an average value $LS_{Ave}$ of the static position data Ls1 to Ls3 written in the position data table (see FIG. 10A) in the reference mark position data storage section 274 to obtain a difference between the two values (step S17). If the result of the comparison of step S17 indicates a difference which is equal to or less than a predetermined value (e.g., five pixels) (step S18), the reference mark position data comparison section 273 determines that the position data of the reference mark rm1 which has been detected at step S12 above is valid, and proceeds to next step S19. On the other hand, if the result of the comparison of step S17 does not satisfy the predetermined value (step S18), the reference mark position data comparison section 273 determines that the position data of the reference mark rm1 which has been detected at step S12 above is invalid, thereby establishing that the detection of reference mark rm has failed, and proceeds to next step S20.

Figure 11:
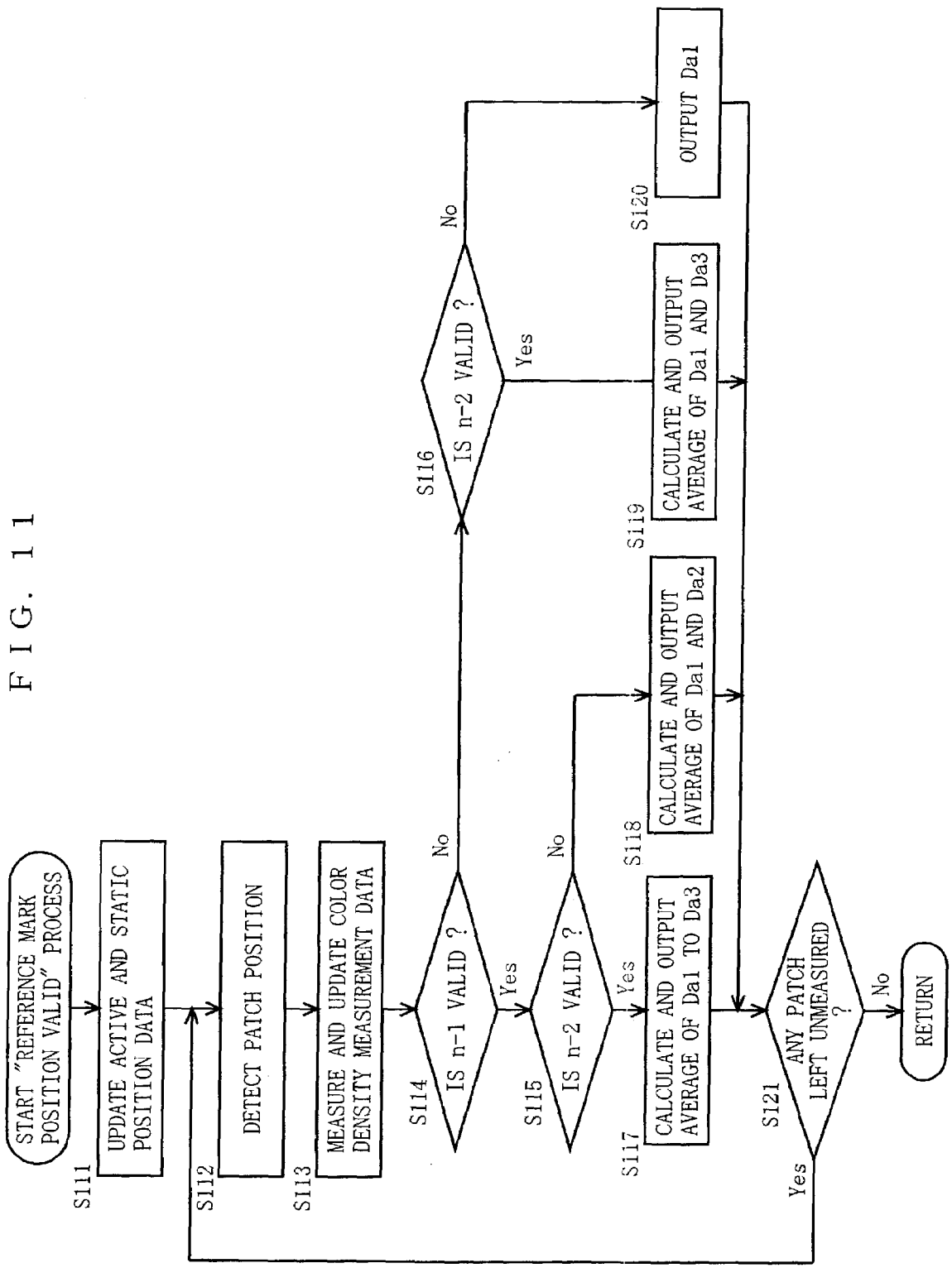
FIG. 11 is a flowchart illustrating the detailed procedure of the process performed at step S19 in FIG. 8.

Step S19 is a "reference mark position valid" process which is performed if the reference mark position data comparison section 273 determines at step S16 or S18 that the position data of the reference mark rm1 which has been detected at step S12 above is valid. Now, the detailed processing procedure of step S19 will be described with reference to FIG. 11. FIG. 11 is a flowchart illustrating the detailed procedure of the process performed at step 19 in FIG. 8.

In FIG. 11, the reference mark position data comparison section 273 updates the position data table in the reference mark position data storage section 274 by storing the position data of the crosspoint P of the reference mark rm1 as detected at step S12 as the most-recent active position data and static position data (step S111), and proceeds to next step S112.

At step S111, the position data table (see FIG. 10A) is updated by the reference mark position data comparison section 273 by storing the position data of the crosspoint P of the reference mark rm1 as detected at step S12 as the most-recent active position data La1 and static position data Ls1, and by storing the current count value n as the count values na1 and ns1. The reference mark position data comparison section 273 updates the position data table also with respect to any other active position data and static position data which are already written in the position data table. Preferably, the update of the position data table is performed in different manners, depending on whether the position data of the crosspoint P of the reference mark rm1 as detected at step S12 has been determined as valid at step S16 (i.e., against the average value $La_{Ave}$ of the active position data La1 to La3), or at step S18 (i.e., against the average value $Ls_{Ave}$ of the static position data Ls1 to Ls3).

Specifically, if the validity has been established through the process of step S16, the reference mark position data comparison section 273 deletes from the position data table the active position data La3, the count value na3, the static position data Ls3, and the count value ns3 which are already written in the third and sixth storage areas, writes in the third storage area the active position data La2 and the count value na2 (which are written in the second storage area), and writes in the second storage area the active position data La1 and the count value na1 (which are written in the first storage area) in place of the already-written active position data La2 and count value na2. Furthermore, the reference mark position data comparison section 273 writes the most-recent active position data La1 and static position data Ls1 detected at step S12, and their respective count values na1 and ns1 in the first and fourth storage areas of the position data table, thus performing a preliminarily update of the position data table. Thereafter, the reference mark position data comparison section 273 finally updates the position data table by using the active position data La2 and La3 which are present after the preliminary update. Specifically, in the fifth storage area, the reference mark position data comparison section 273 writes the "new" active position data La2 and the count value na2 which are present in the second storage area after the aforementioned preliminary update, in place of the already-written static position data Ls2 and count value ns2, and in the sixth storage area, writes the "new" active position data La3 and the count value na3 which are present in the third storage area after the aforementioned preliminary update. In other words, the active position data La1 to La3 which are present after the aforementioned preliminary update are written as the static position data Ls1 to Ls3.

On the other hand, if the validity has been established through the process of step S18, the reference mark position data comparison section 273 deletes from the position data table the active position data La3, the count value na3, and the static position data Ls3, and the count value ns3 which are already written in the third and sixth storage areas, writes in the third storage area the active position data La2 and the count value na2 (which are written in the second storage area), and writes in the second storage area the active position data La1 and the count value na1 (which are written in the first storage area) in place of the already-written active position data La2 and count value na2. Furthermore, in the sixth storage area of the position data table, the reference mark position data comparison section 273 writes the static position data Ls2 and the count value ns2 (which are written in the fifth storage area), and in the fifth storage area, the static position data Ls1 and the count value ns1 (which are written in the fourth storage area) in place of the already-written static position data Ls2 and count value ns2. Then, the update of the position data table is completed when the reference mark position data comparison section 273 writes the most-recent active position data La1 and static position data Ls1 detected at step S12 and their respective count values na1 and ns1 in the first and fourth storage areas of the position data table. In this case, the most-recent active position data La1 is written as the static position data Ls1, whereas the static position data Ls2 and Ls3 are consecutively deleted in FIFO fashion, i.e., the older static position data is deleted first.

Next, at step S112, the patch position detection section 275 selects a patch to be measured from among the plurality of patches in a control strip cs, and by using the deployed position information Dpn from the print control section 21, extracts relative position data of the patch from the reference mark rm which lies closest to the patch. Then, by using the extracted relative position data, the patch position detection section 275 detects the patch to be measured within the printed-image data Dpd stored in the data storage section 271, in reference to the position data of the reference mark rm detected at step S12. The patch position detection at step S112 is identical to that of step S102 above, and any detailed description is omitted here.

Next, the color density measurement section 276 retrieves the predetermined pixels of the patch as detected by the patch position detection section 275 at step S112 from the printed-image data Dpd stored in the data storage section 271, and generates color density measurement data Da by measuring the color density (e.g., density and/or dot percentage) of the printed patch. The color density measurement section 276 outputs the color density measurement data Da to the color density calculation section 277. The color density calculation section 277 causes the color density measurement data Da outputted from the color density measurement section 276 to be stored to the color density measurement data table in the color density measurement data storage section 278, in association with the patch to be measured and the current count value n (step S113).

In the case where the patch pc1 (FIGS. 15A and 15B) has been measured at step S113, the color density calculation section 277 updates the color density measurement data table (see FIG. 10B) by storing the color density measurement data Da of the patch pc1 as measured by the color density measurement section 276 as the most-recent color density measurement data Da1, and by storing the current count value n as the count value na1. The color density calculation section 277 also updates the color density measurement data table with respect to any other color density measurement data already written in the color density measurement data table, in FIFO fashion. Specifically, the color density calculation section 277 deletes from the color density measurement data table the color density measurement data Da3 and the count value na3 which are already written in the ninth storage area, writes in the ninth storage area the color density measurement data Da2 and the count value na2 (which are written in the eighth storage area), and writes in the eighth storage area the color density measurement data Da1 and the count value na1 (which are written in the seventh storage area) in place of the already-written color density measurement data Da2 and count value na2. Then, the update of the color density measurement data table is completed when the color density calculation section 277 writes the most-recent color density measurement data Da1 measured by the color density measurement section 276 and the count value na1 in the seventh storage area of the color density measurement data table.

Next, by referring to the color density measurement data table (FIG. 10B) in the color density measurement data storage section 278, the color density calculation section 277 determines whether the respective color density measurement data Da2 and Da3 corresponding to the count values n−1 and n−2 (i.e., na2 and na3 in the color density measurement data table) are valid or not (steps S114 to S116). The validity determination for the color density measurement data by the color density calculation section 277 can be based upon whether null data (described later) is written as the color density measurement data or not. Alternatively, this determination may be made by referring to the count values ns1 to ns3 for the static position data Ls1 to Ls3 written in the position data table because, as described later, the static position data is only updated when the position data of the reference mark rm1 is determined as valid.

If the color density measurement data Da2 and Da3 written in the color density measurement data table corresponding to the count values n−1(na2) and n−2(na3) are both valid, the color density calculation section 277 calculates an average value of the color density measurement data Da1 to Da3 written in the color density measurement data table, and outputs the calculated average value to the print control section 21 as color density information Dct (step S117). Then, the control proceeds to next step S121.

If only the color density measurement data Da2 corresponding to the count value n−1(na2) is valid (i.e., the color density measurement data Da3 corresponding to the count value n−2(na3) is invalid), the color density calculation section 277 calculates an average value of the color density measurement data Da1 and Da2 written in the color density measurement data table, and outputs the calculated average value to the print control section 21 as color density information Dct (step S118) Then, the control proceeds to next step S121.

If only the color density measurement data Da3 corresponding to the count value n−2(na3) is valid (i.e., the color density measurement data Da2 corresponding to the count value n−1(na2) is invalid), the color density calculation section 277 calculates an average value of the color density measurement data Da1 and Da3 written in the color density measurement data table, and outputs the calculated average value to the print control section 21 as color density information Dct (step S119) Then, the control proceeds to next step S121.

If the color density measurement data Da2 and Da3 written in the color density measurement data table corresponding to the count values n−1(na2) and n−2(na3) are both invalid, the color density calculation section 277 outputs the color density measurement data Da1 written in the color density measurement data table to the print control section 21 as color density information Dct (step S120). Then, the control proceeds to next step S121.

Next, the patch measurement device 27 determines whether or not there are any patches whose color density information Dct has not been calculated yet (step S121). If there are any such patches, the control returns to step S112 to calculate color density information Dct for an uncalculated patch. On the other hand, if it is determined that the calculation has been completed for all patches, the patch measurement device 27 ends the procedure of FIG. 11.

Figure 12:
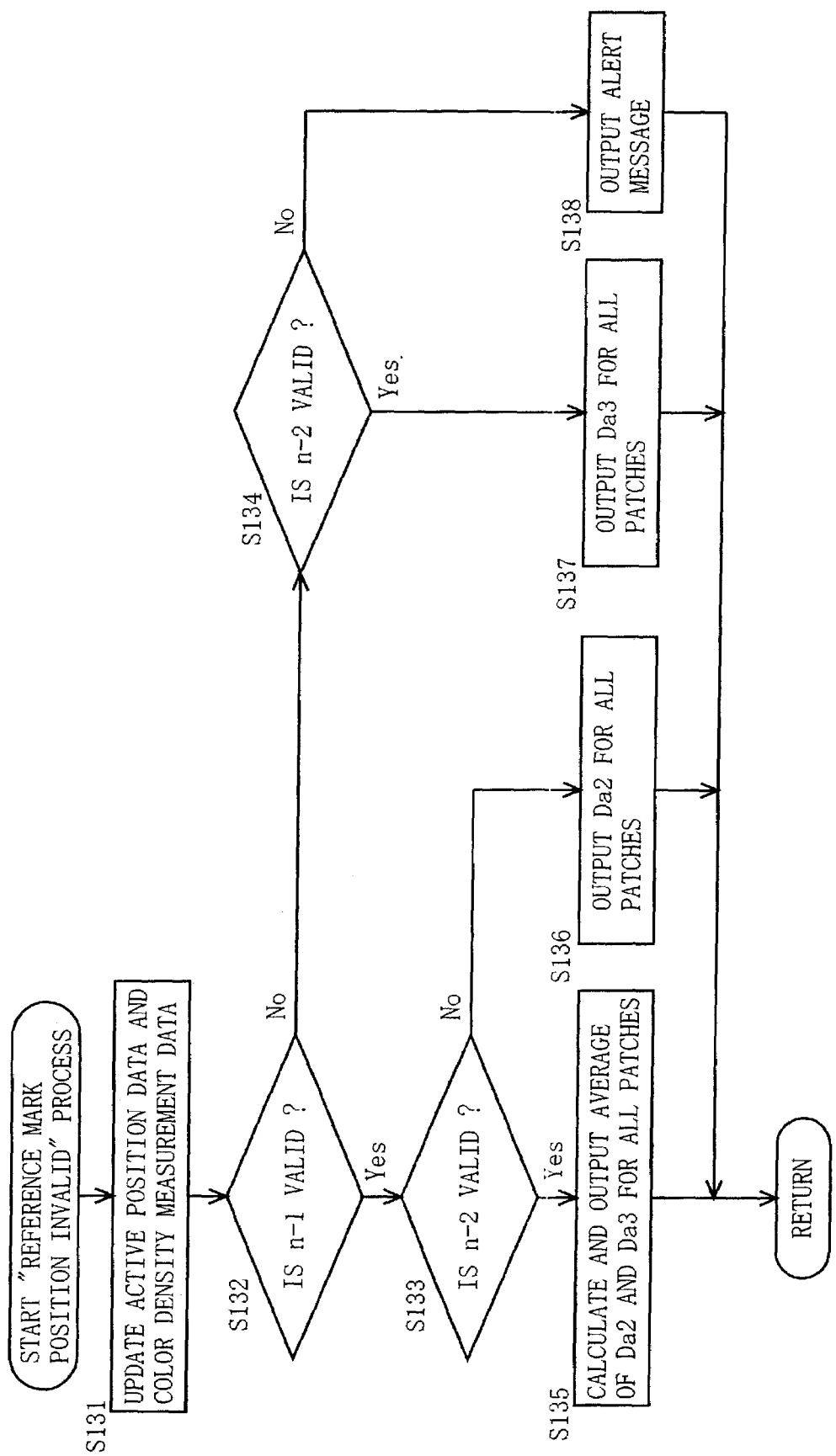
FIG. 12 is a flowchart illustrating the detailed procedure of the process performed at step S20 in FIG. 8.

Referring back to FIG. 8, if the position data of the reference mark rm1 which has been detected at step S12 above is determined as invalid at both steps S16 and S18 (i.e., the position data detected at step S12 fails to produce a difference with respect to both average values $La_{Ave}$ and $Ls_{Ave}$ such that the difference is equal to or smaller than a predetermined value), the reference mark position data comparison section 273 establishes that the detection of reference mark rm has failed, and proceeds to a "reference mark position invalid" process of step S20. Now, the detailed processing procedure of step S20 will be described with reference to FIG. 12. FIG. 12 is a flowchart illustrating the detailed procedure of the process performed at step 20 in FIG. 8.

In FIG. 12, the reference mark position data comparison section 273 updates the position data table in the reference mark position data storage section 274 by storing the position data of the crosspoint P of the reference mark rm1 as detected at step S12 as the most-recent active position data, and updates the color density measurement data table by storing null data therein (step S131).

At step S131 above, the reference mark position data comparison section 273 updates the position data table (see FIG. 10A) by storing the position data of the crosspoint P of the reference mark rm1 as detected at step S12 as the most-recent active position data La1, and by storing the current count value n as the count value na1. The reference mark position data comparison section 273 also updates the position data table with respect to any other active position data already written in the position data table, in FIFO fashion. Specifically, the reference mark position data comparison section 273 deletes from the position data table the active position data La3 and the count value na3 which are already written in the third storage area of the position data table, writes in the third storage area the active position data La2 and the count value na2 (which are written in the second storage area), and writes in the second storage area the active position data La1 and the count value na1 (which are written in the first storage area) in place of the already-written active position data La2 and count value na2. Then, the update of the position data table is completed when the reference mark position data comparison section 273 writes the most-recent active position data La1 and the count value na1 detected at step S12 in the first storage area of the position data table. Note that the reference mark position data comparison section 273 does not update the static position data Ls1 to Ls3 in the position data table because the position data of the reference mark rm1 which has been detected at step S12 above is invalid.

Moreover, at step S131 above, the reference mark position data comparison section 273 updates the color density measurement data table (see FIG. 10B) by storing null data in the color density measurement data and by storing the current count value n as the count value na1. The null data may be any form of data which the color density calculation section 277 can recognize as invalid. For example, null data may be indicated as an absence of data. The reference mark position data comparison section 273 also updates the color density measurement data table with respect to any other color density measurement data already written in the color density measurement data table, in FIFO fashion. Specifically, the reference mark position data comparison section 273 deletes from the color density measurement data table the color density measurement data Da3 and the count value na3 which are already written in the ninth storage area, writes in the ninth storage area the color density measurement data Da2 and the count value na2 (which are written in the eighth storage area), and writes in the eighth storage area the color density measurement data Da1 and the count value na1 (which are written in the seventh storage area) in place of the already-written color density measurement data Da2 and count value na2. Then, the update of the color density measurement data table is completed when the reference mark position data comparison section 273 writes the aforementioned null data (as the most-recent color density measurement data Da1) and the count value na1 in the seventh storage area of the color density measurement data table.

Next, by referring to the color density measurement data table (FIG. 10B) in the color density measurement data storage section 278, the color density calculation section 277 determines whether the respective color density measurement data Da2 and Da3 corresponding to the count values n−1 and n−2 (i.e., na2 and na3 in the color density measurement data table) are valid or not (steps S132 to S134). As is the case with steps S114 to S116 described above, the validity determination for the color density measurement data by the color density calculation section 277 can be based upon whether null data (described later) is written as the color density measurement data or not. Alternatively, this determination may be made by referring to the count values ns1 to ns3 for the static position data Ls1 to Ls3 written in the position data table.

If the color density measurement data Da2 and Da3 written in the color density measurement data table corresponding to the count values n−1(na2) and n−2(na3) are both valid, the color density calculation section 277 calculates an average value of the color density measurement data Da2 and Da3 with respect to every patch whose color density measurement data is written in the color density measurement data table, and outputs the calculated average values to the print control section 21 as color density information Dct for all patches (step S135). Then, the patch measurement device 27 ends the procedure of FIG. 12.

If only the color density measurement data Da2 corresponding to the count value n−1(na2) is valid (i.e., the color density measurement data Da3 corresponding to the count value n−2(na3) is invalid), the color density calculation section 277 outputs the color density measurement data Da2 with respect to every patch whose color density measurement data is written in the color density measurement data table to the print control section 21 as color density information Dct for all patches (step S136). Then, the patch measurement device 27 ends the procedure of FIG. 12.

If only the color density measurement data Da3 corresponding to the count value n−2(na3) is valid (i.e., the color density measurement data Da2 corresponding to the count value n−1(na2) is invalid), the color density calculation section 277 outputs the color density measurement data Da3 with respect to every patch whose color density measurement data is written in the color density measurement data table to the print control section 21 as color density information Dct for all patches (step S137). Then, the patch measurement device 27 ends the procedure of FIG. 12.

If the color density measurement data Da2 and Da3 written in the color density measurement data table corresponding to the count values n−1(na2) and n−2(na3) are both invalid, the color density calculation section 277 outputs an alert message to the print control section 21 as the color density information Dct, in order to indicate to the operator that the color density measurement data written in the color density measurement data table are all null data (step S138). Then, the patch measurement device 27 ends the procedure of FIG. 12.

Now, referring to FIGS. 13 and 14, exemplary manners in which the position data table is updated through the color density information calculation procedure by the patch measurement device 27 will be described. FIG. 13 illustrates a manner in which the position data table is updated in an exemplary case where an abruptly deviated value of position data for the reference mark rm1 is detected when the count value n satisfies n=50.

In the following description of FIG. 13, the position data of the reference mark rm1 as detected at each count value n will be referred to as "detected position data L". For conciseness, it is conveniently assumed that, when accurately detected, the reference mark rm1 will result in the detected position data L being "30", whereas any deviation in the detected position of the reference mark rm1 will result in the detected position data L being "0". It is further assumed that the detected position data L will be determined as valid when it has a difference of ±5 or less from the average value $La_{Ave}$ or $Ls_{Ave}$. Note that, for a given piece of detected position data L obtained at a count value n, FIG. 13 illustrates the active and static position data La1 to La3 and Ls1 to Ls3 and their average values $La_{Ave}$ and $Ls_{Ave}$ as used for the validity determination (at steps S15 and S17 in FIG. 8) on the count value n, rather than those which will exist after the patch measurement device 27 has updated the position data table (at steps S19 and S20 in FIG. 8) on the count value n.

In the example shown in FIG. 13, while the count value n satisfies n<50, the patch measurement device 27 is stably detecting the accurate position data L to be 30 (L=30). Therefore, while n<50, L=30 is written in the position data table as the active and static position data La1 to La3 and Ls1 to Ls3, thereby resulting in average values $La_{Ave}$ and $Ls_{Ave}$ of "30" ($La_{Ave}$=30 and $Ls_{Ave}$=30). Therefore, while n<50, the patch measurement device 27 determines the detected position data L=30 to be valid.

When the count value n satisfies n=50, an abruptly deviated value "0" of position data for the reference mark rm1 is detected, so that the detected position data L=0 is inputted to the patch measurement device 27. Since the patch measurement device 27 recognizes validity based on a difference of ±5 or less from the average value $La_{Ave}$=30 or $Ls_{Ave}$=30 the detected position data L=0 at n=50 is determined as invalid.

While the count value n=51 to 53, the patch measurement device 27 is again stably detecting the accurate detected position data L=30. However, since the detected position data L=0 at n=50 is written in the position data table as the active position data La1 to La3, an average value $La_{Ave}$ of "20" will result ($La_{Ave}$=20). On the other hand, L=0 is not written in the position data table as the static position data Ls1 to Ls3, thereby resulting in an average value $Ls_{Ave}$ of "30" ($Ls_{Ave}$=30). Since the patch measurement device 27 recognizes validity based on a difference of ±5 or less from the average value $La_{Ave}$=20 or $Ls_{Ave}$=30, the detected position data L=30 when the count value n satisfies n=51 to 53 is determined as valid, based on the average value $Ls_{Ave}$=30 of the static position data Ls1 to Ls3.

While the count value n satisfies n=54, the patch measurement device 27 is stably detecting the accurate position data L=30. Therefore, while n=54, the patch measurement device 27 determines the detected position data L=30 to be valid, as in the case where n<50.

Thus, through the color density information calculation procedure as described above, if an abruptly deviated value of position data for the reference mark rm1 is detected at n=50, the patch measurement device 27 only determines the detected position data L to be invalid. When again beginning to stably detect the accurate detected position data at n=51, the patch measurement device 27 can determine the accurate position data to be valid, based on the average value $Ls_{Ave}$ of the static position data Ls1 to Ls3.

Figure 14:
FIG. 14 illustrates a manner in which the position data table is updated through the color density information calculation procedure by the patch measurement device 27 shown in FIG. 1 in an exemplary case where deviated values of position data for a reference mark rm1 are detected in an initial period.

Next, with reference to FIG. 14, a manner in which the position data table is updated in an exemplary case where deviated values of position data for a reference mark rm1 are detected in an initial period (the count value n=1 to 3) due to unstable operation of the printing apparatus 2 is described.

In the following description of FIG. 14, as in the description of FIG. 13, the position data of the reference mark rm1 as detected at each count value n will be referred to as "detected position data L". For conciseness, it is conveniently assumed that, when accurately detected, the reference mark rm1 will result in the detected position data L being "30", whereas any deviation in the detected position of the reference mark rm1 will result in the detected position data L being "0". It is further assumed that the detected position data L will be determined as valid when it has a difference of ±5 or less from the average value $La_{Ave}$ or $Ls_{Ave}$. Note that, for a given piece of detected position data L obtained at a count value n, FIG. 14 illustrates the active and static position data La1 to La3 and Ls1 to Ls3 and their average values $La_{Ave}$ and $Ls_{Ave}$ as used for the validity determination (at steps S15 and S17 in FIG. 8) on the count value n, rather than those which will exist after the patch measurement device 27 has updated the position data table (at steps S19 and S20 in FIG. 8) on the count value n.

When the count value n satisfies n=1 to 3, deviated values "0" of position data for the reference mark rm1 are detected, so that the detected position data L=0 is inputted to the patch measurement device 27. However, since the patch measurement device 27 is conditioned to perform an initial process (see step S14 in FIG. 8) when the count value n satisfies n=1 to 3, the detected position data L=0 is universally written in the position data table as the active and static position data La1 to La3 and Ls1 to Ls3. Note that, during the initial process, the patch measurement device 27 does not subject the detected position data L to a comparison process to determine the validity thereof, as described earlier.

When the count value n satisfies n=4 to 6, the patch measurement device 27 is stably detecting the accurate position data L=30. However, the detected position data L=0 is universally written in the position data table as the active and static position data La1 to La3 and Ls1 to Ls3 when count value n=1 to 3, thereby resulting in average values $La_{Ave}$=0 to 20 and $Ls_{Ave}$=0 (as indicated under n=4 to 6). Therefore, when the count value n satisfies n=4 to 6, the patch measurement device 27 determines the detected position data L=30 to be invalid.

When the count value n satisfies n=7, the patch measurement device 27 is also stably detecting the accurate position data L=30. Since the active position data La1 to La3 in the position data table will have been all updated to L=30 at the end of the turn on the count value n=6, an average value $La_{Ave}$ of "30" ($La_{Ave}$=30) will result (as indicated under n=7). On the other hand, the static position data Ls1 to Ls3 in the position data table are not updated to L=30, but instead remain at L=0 as when n=1 to 3, thereby resulting in an average value $Ls_{Ave}$ of "0" ($Ls_{Ave}$=0) Since the patch measurement device 27 recognizes validity based on a difference of +5 or less from the average value $La_{Ave}$=30 or $Ls_{Ave}$=0, the detected position data L=30 when the count value n satisfies n=7 is determined as valid, based on the average value $La_{Ave}$=30 of the active position data La1 to La3. As described earlier, when updating the position data table at the end of the turn on the count value n=7, the patch measurement device 27 writes the active position data La1 to La3 as the static position data Ls1 to Ls3.

While the count value n satisfies n>7, the patch measurement device 27 is also stably detecting the accurate position data L=30. The detected position data L=30 while n>7 is written in the position data table as the active and static position data La1 to La3 and Ls1 to Ls3, thereby resulting in average values $La_{Ave}$=30 and $Ls_{Ave}$=30. Therefore, while n>7, the patch measurement device 27 determines the detected position data L=30 to be valid.

Thus, through the color density information calculation procedure as described above, in the case where deviated values of position data for a reference mark rm1 are detected in an initial period (the count value n=1 to 3) due to unstable operation of the printing apparatus 2 and thereafter accurate position data is stably detected, the patch measurement device 27 will temporarily determine the three instances of the accurately detected position data L to be invalid; however, the patch measurement device 27 will determine any following instances of the accurately detected position data L to be valid. In other words, even if incorrect position data is temporarily set as references of determination (i.e., the average values $La_{Ave}$ and $Ls_{Ave}$), the validity of the accurate position data will be properly recognized when the average value $La_{Ave}$ of the active position data La1 to La3 has been updated.

Thus, as can be seen from the exemplary manners of updating the position data table illustrated with reference to FIGS. 13 and 14, when an abruptly deviated value of position data for the reference mark rm1 is detected, the patch measurement device 27 can determine such position data L as invalid, by employing the average values $La_{Ave}$ and $Ls_{Ave}$ of active and static position data La1 to La3 and Ls1 to Ls3. Moreover, when again beginning to stably detect the accurate detected position data, the patch measurement device 27 can immediately determine the accurate position data to be valid on the basis of the average value $Ls_{Ave}$ of the static position data Ls1 to Ls3. Furthermore, even if incorrect position data is temporarily set as references of determination (average values $La_{Ave}$ and $Ls_{Ave}$), the patch measurement device 27 can eventually determine the accurate position data to be valid when the average value $La_{Ave}$ of the active position data La1 to La3 has been updated. It will also be appreciated that, even if the detected position data of the reference mark rm1 presents gradually increasing or decreasing values, the validity of such position data can be accurately determined as the references of determination are varied in the aforementioned manner.

Referring back to FIG. 8, when the "reference mark position valid" process (step S19) or the "reference mark position invalid" process (step S20) is completed, the patch measurement device 27 ends the color density information calculation procedure (FIG. 8) for the predetermined number of sampled sheets.

Then, as described earlier, if the count value n is determined to be greater than three (n>3) at step S7, based on the color density information Dct from the patch measurement device 27, the print control section 21 generates and outputs control information Dcl, in accordance with which the supply amounts of ink and/or dampening water used in the aforementioned printing mechanism 23 are adjusted. Thus, the amount of ink supplied from the ink supply unit 239 and/or the amount of dampening water supplied from the dampening water supply unit 238 are automatically controlled. The print control section 21 outputs the color density information Dct to the display device 28 in order to inform the operator of the color density information Dct. If the color density information Dct outputted from the print control section 21 represents an alert message, the display device 28 displays an alert message, in which case the ink supply unit 239 and the dampening water supply unit 238 do not adjust the supply amounts of ink and/or dampening water, but instead respectively maintain the currently supplied amounts.

Thus, in accordance with the patch measurement device of the present embodiment of the present invention, the validity of position data of a reference mark which serves as a reference for detecting the position of a control strip is determined by using two kinds of average values based on past instances of such position data. When the position data is invalid, the patch measurement device does not measure the color density of the control strip printed on the printed material, and instead outputs the valid past color density information, thereby preventing incorrect color density information from being transmitted to the printing apparatus. Thus, at the printing apparatus, it is possible to properly control the ink supply amounts and the like during a printing process. Since the patch measurement device does not measure the color density of the control strip printed on the printed material when the position data is invalid, it is possible to reduce the processing cost at the patch measurement device. If the reduction in the processing cost at the patch measurement device is not desired, the color density of the control strip printed on the printed material may be measured irrespective of the validity determination result of the position data. Furthermore, when an abruptly deviated value of position data for the reference mark is detected, the patch measurement device 27 only determines the deviated position data to be invalid, based on the two kinds of average values. Furthermore, even if incorrect position data is temporarily set as the two kinds of average values, the patch measurement device 27 can eventually determine the accurate position data to be valid when one kind average value has been updated. Even if the detected position data of the reference mark presents gradually increasing or decreasing values, the validity of such position data can be accurately determined as the references of determination are varied accordingly. In other words, the present patch measurement device can successfully cope with the general tendency of printing apparatuses, i.e., gradually increasing printing density from the beginning of printing and the initial instability of operation.

The above embodiment illustrates an example where average values $La_{Ave}$ and $Ls_{Ave}$ are obtained by taking averages of three pieces of active and static position data La1 to La3 and Ls1 to Ls3 which are written in the position data table. However, the principle of the present invention does not limit itself to the use of averages of three pieces of data. For example, average values of four or more pieces of active and static position data La and Ls written in the position data table may be calculated. Alternatively, the validity of position data may be determined based on calculations other than averaging.

The above embodiment illustrates an example where the color density measurement data Da1 to Da3 written in the color density measurement data table are three most-recently measured pieces of color density measurement data, and color density information is calculated based on an average of such three pieces of color density measurement data; however, the principle of the present invention does not limit itself to the use of three most-recently measured pieces of color density measurement data. While the use of most-recently measured color density measurement data makes it possible to calculate color density information which approximates the current printed state of the printed material, if such an effect is not desired, four or more pieces of color density measurement data may be written in the color density measurement data table, and an average value thereof may be calculated, or, only the color density measurement data that has been determined as valid may be written in the color density measurement data table and an average value thereof may be calculated, for example. The data to be outputted as color density information may be generated based on calculations other than averaging. A single most-recently measured valid piece of color density measurement data may be outputted as color density information.

Although the above embodiment illustrates an example where the update of the position data table is performed in different manners depending on whether the validity has been established through the process of step S16 or step S18, the update may alternatively be performed in the same manner irrespectively, i.e., in the manner described with reference to the case where the validity has been established through the process of step S18.

The above embodiment illustrates an example where the patch position detection is performed based on patch distances from the closest reference mark rm, in order to minimize the calculation error of the patch distances, which becomes greater for patches located farther away from the reference mark rm. If such an effect is not desired, the patch positions may be detected by utilizing one fixed reference mark rm (e.g., a reference mark rm1 located in the middle) for all measured patch distances, for example. Although the above embodiment illustrates a preferable example where the center position of a given patch is detected, any other position in the patch may alternatively be detected.

While the invention has been described in detail, the foregoing description is in all aspects illustrative and not restrictive. It is understood that numerous other modifications and variations can be devised without departing from the scope of the invention.

What is claimed is:

1. A patch measurement device provided in a printing apparatus for measuring a color density of a patch in a control strip printed on paper by the printing apparatus, wherein,
    the control strip and a reference mark are printed on the paper, and
    printed-image data representing the control strip and the reference mark printed on the paper are generated through imaging by an imaging device provided in the printing apparatus,
    the patch measurement device comprising:
    an image data storage section for storing the printed-image data sent from the imaging device;
    a reference mark detection section for detecting the reference mark based on the printed-image data stored in the image data storage section, and generating position data of the reference mark;
    a position data storage section for storing the position data generated by the reference mark detection section;
    a reference mark position data comparison section for determining whether the current position data of the reference mark as detected by the reference mark detection section is valid or not by using the past position data stored in the position data storage section; and
    a color density measurement section for generating color density measurement data by measuring a color density of the patch based on the result of the determination by the reference mark position data comparison section.

2. The patch measurement device according to claim 1, wherein, based on a plurality of most-recently stored pieces of position data in the position data storage section, the reference mark position data comparison section determines whether or not the current position data of the reference mark as detected by the reference mark detection section satisfies a predetermined value.

3. The patch measurement device according to claim 1, wherein, based on a plurality of pieces of position data stored in the position data storage section which have previously been determined to be valid, the reference mark position data comparison section determines whether or not the current position data of the reference mark as detected by the reference mark detection section satisfies a predetermined value.

4. The patch measurement device according to claim 1, further comprising:
    a color density measurement data storage section for storing the color density measurement data generated by the color density measurement section; and a color density calculation section for generating color density information by performing a predetermined calculation by using the color density measurement data stored in the color density measurement data storage section, and outputting the color density information to the printing apparatus.

5. The patch measurement device according to claim 4, wherein, when the reference mark position data comparison section determines the position data of the reference mark as detected by the reference mark detection section to be valid, the color density measurement section generates current color density measurement data representing the current color density of the patch, the color density calculation section generates the color density information by performing a predetermined calculation by using the current color density measurement data and the past color density measurement data stored in the color density measurement data storage section, and when the reference mark position data comparison section determines the position data of the reference mark as detected by the reference mark detection section to be invalid, the color density calculation section generates the color density information by performing a predetermined calculation by using only the past color density measurement data stored in the color density measurement data storage section.

6. The patch measurement device according to claim 5, wherein, when the reference mark position data comparison section has determined the position data of the reference mark as detected by the reference mark detection section to be invalid more than a predetermined number of times, the color density calculation section generates, as the color density information, an alert message indicating a failure to measure the color density.

7. The patch measurement device according to claim 6, wherein the color density information calculated by the color density calculation section is outputted to a display device provided in the printing apparatus.

8. A printing apparatus for printing an image to be printed, a control strip, and a reference mark on paper, comprising:

a prepressing mechanism for forming the image to be printed, the control strip, and the reference mark on a printing plate;

a printing mechanism for applying at least ink on the printing plate fed from the prepressing mechanism, and transferring the image to be printed, the control strip, and the reference mark from the printing plate having the ink applied thereto onto the paper;

an imaging device for imaging, within the printing mechanism, a portion of the paper where at least the control strip and the reference mark are printed, thereby generating printed-image data;

a patch measurement device for, based on the printed-image data generated by the imaging device, detecting a patch position representing a position of a patch in the control strip with respect to the reference mark, measuring a color density of the patch, and calculating the result of measurement as color intensity information; and a display device for displaying the color density information calculated by the patch measurement device, the patch measurement device comprising:

an image data storage section for storing the printed-image data sent from the imaging device;

a reference mark detection section for detecting the reference mark based on the printed-image data stored in the image data storage section, and generating position data of the reference mark;

a position data storage section for storing the position data generated by the reference mark detection section;

a reference mark position data comparison section for determining whether the current position data of the reference mark as detected by the reference mark detection section is valid or not by using the past position data stored in the position data storage section;

a color density measurement section for generating color density measurement data by measuring a color density of the patch based on the result of the determination by the reference mark position data comparison section;

a color density measurement data storage section for storing the color density measurement data generated by the color density measurement section; and a color density calculation section for generating color density information by performing a predetermined calculation by using the color density measurement data stored in the color density measurement data storage section, wherein the printing mechanism adjusts the amount of ink to be applied to the printing plate based on the color density information calculated by the patch measurement device.

9. The printing apparatus according to claim 8, wherein, based on a plurality of most-recently stored pieces of position data in the position data storage section, the reference mark position data comparison section determines whether or not the current position data of the reference mark as detected by the reference mark detection section satisfies a predetermined value.

10. The printing apparatus according to claim 8, wherein, based on a plurality of pieces of position data stored in the position data storage section which have previously been determined to be valid, the reference mark position data comparison section determines whether or not the current position data of the reference mark as detected by the reference mark detection section satisfies a predetermined value.

11. The printing apparatus according to claim 10, wherein, when the reference mark position data comparison section determines the position data of the reference mark as detected by the reference mark detection section to be valid, the color density measurement section generates current color density measurement data representing the current color density of the patch, the color density calculation section generates the color density information by performing a predetermined calculation by using the current color density measurement data and the past color density measurement data stored in the color density measurement data storage section, and when the reference mark position data comparison section determines the position data of the reference mark as detected by the reference mark detection section to be invalid, the color density calculation section generates the color density information by performing a predetermined calculation by using only the past color density measurement data stored in the color density measurement data storage section.

12. The printing apparatus according to claim 11, wherein, when the reference mark position data comparison section has determined the position data of the reference mark as detected by the reference mark detection section to be invalid more than a predetermined number of times, the color density calculation section generates, as the color density information, an alert message indicating a failure to measure the color density.

13. A patch measurement method for measuring a color density of a patch in a control strip printed on paper, wherein the control strip and a reference mark are printed on the paper, the method comprising:
an image data storage step of storing printed-image data representing the control strip and the reference mark printed on the paper;
a reference mark detection step of detecting the reference mark based on the printed-image data stored by the image data storage step, and generating position data of the reference mark;
a position data storage step of storing the position data generated by the reference mark detection step;
a reference mark position data comparison step of determining whether the current position data of the reference mark as detected by the reference mark detection step is valid or not by using the past position data stored by the position data storage step; and
a color density measurement step of generating color density measurement data by measuring a color density of the patch based on the result of the determination by the reference mark position data comparison step.

14. The patch measurement method according to claim 13, wherein, based on a plurality of most-recently stored pieces of position data in the position data storage step, the reference mark position data comparison step determines whether or not the current position data of the reference mark as detected by the reference mark detection step satisfies a predetermined value.

15. The patch measurement method according to claim 13, wherein, based on a plurality of pieces of position data stored by the position data storage step which have previously been determined to be valid, the reference mark position data comparison step determines whether or not the current position data of the reference mark as detected by the reference mark detection step satisfies a predetermined value.

16. The patch measurement method according to claim 13, further comprising:
a color density measurement data storage step of storing the color density measurement data generated by the color density measurement step; and
a color density calculation step of generating color density information by performing a predetermined calculation by using the color density measurement data stored by the color density measurement data storage step and outputting the color density information to a printing apparatus.

17. The patch measurement method according to claim 16,
wherein,
when the reference mark position data comparison step determines the position data of the reference mark as detected by the reference mark detection step to be valid,
the color density measurement step generates current color density measurement data representing the current color density of the patch,
the color density calculation step generates the color density information by performing a predetermined calculation by using the current color density measurement data and the past color density measurement data stored by the color density measurement data storage step, and
when the reference mark position data comparison step determines the position data of the reference mark as detected by the reference mark detection step to be invalid, the color density calculation step generates the color density information by performing a predetermined calculation by using only the past color density measurement data stored by the color density measurement data storage step.

* * * * *